United States Patent [19]
Siddappa

[11] Patent Number: 5,974,486
[45] Date of Patent: Oct. 26, 1999

[54] UNIVERSAL SERIAL BUS DEVICE CONTROLLER COMPRISING A FIFO ASSOCIATED WITH A PLURALITY OF ENDPOINTS AND A MEMORY FOR STORING AN IDENTIFIER OF A CURRENT ENDPOINT

[75] Inventor: Mahesh Siddappa, San Jose, Calif.

[73] Assignee: Atmel Corporation, San Jose, Calif.

[21] Appl. No.: 08/909,988

[22] Filed: Aug. 12, 1997

[51] Int. Cl.$^6$ ................................................. G06F 13/14
[52] U.S. Cl. ............................... 710/53; 710/4; 710/52
[58] Field of Search .............................. 178/3; 370/414, 370/453, 465; 340/825.44; 395/680; 364/131; 711/156; 709/300

[56] References Cited

U.S. PATENT DOCUMENTS

| | | | |
|---|---|---|---|
| 4,203,001 | 5/1980 | Condon | 178/3 |
| 4,958,342 | 9/1990 | Williams et al. | 370/465 |
| 4,979,167 | 12/1990 | McCool | 370/453 |
| 5,437,031 | 7/1995 | Kitami | 395/680 |
| 5,535,197 | 7/1996 | Cotton | 370/414 |
| 5,568,134 | 10/1996 | Cannon et al. | 340/825.44 |
| 5,721,722 | 2/1998 | Kato et al. | 364/131 |
| 5,860,119 | 1/1999 | Dockser | 711/156 |

OTHER PUBLICATIONS

CYPRESS Data Sheet for CY7C634xx Controllers, Mar. 21, 1997.
INTEL Data Sheet for 8x930Ax USB Controller, 1997.
CAE Data Sheet, Feb. 1997.

*Primary Examiner*—Thomas C. Lee
*Assistant Examiner*—Chien Yuan
*Attorney, Agent, or Firm*—Thomas Schneck

[57] ABSTRACT

A versatile USB controller comprises a serial interface engine (SIE) for connection with a host. The SIE is capable of simulating a disconnect/connect sequence in situations where a reboot of the device is appropriate. The controller further includes a control store for keeping track of multiple endpoints of a device. A FIFO provides data transfer between each of the endpoints and the host. A state machine provides transaction sequencing with the host for each endpoint. In a variation of the preferred embodiment, a second FIFO is included to provide additional buffering capability.

27 Claims, 20 Drawing Sheets

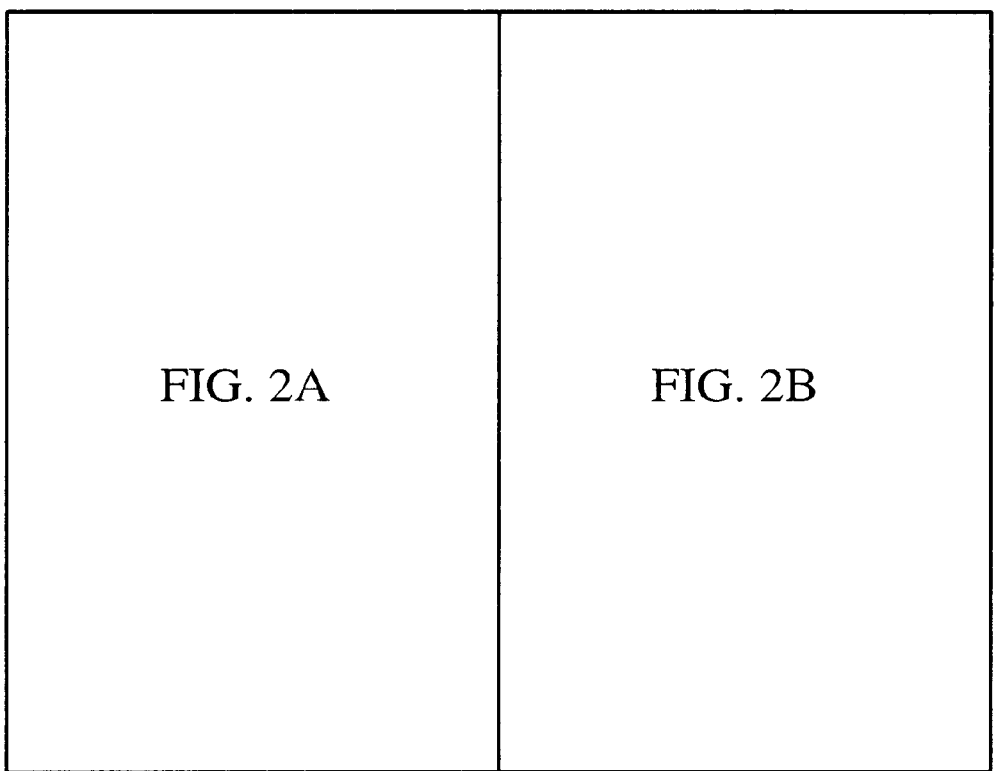
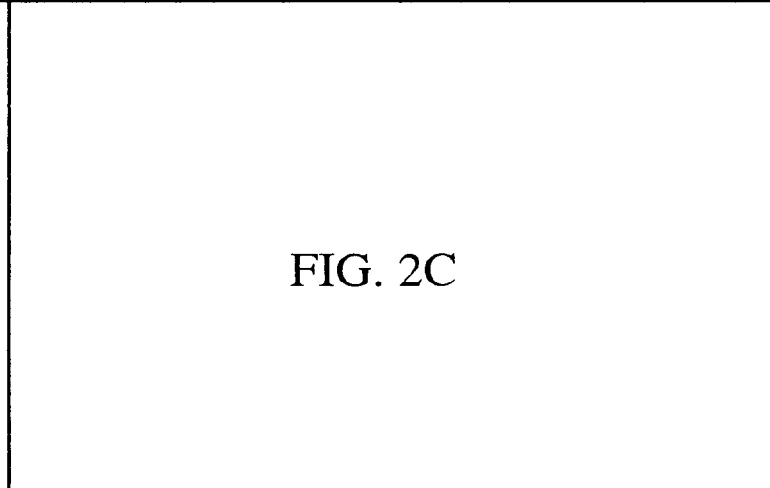
FIG. 2

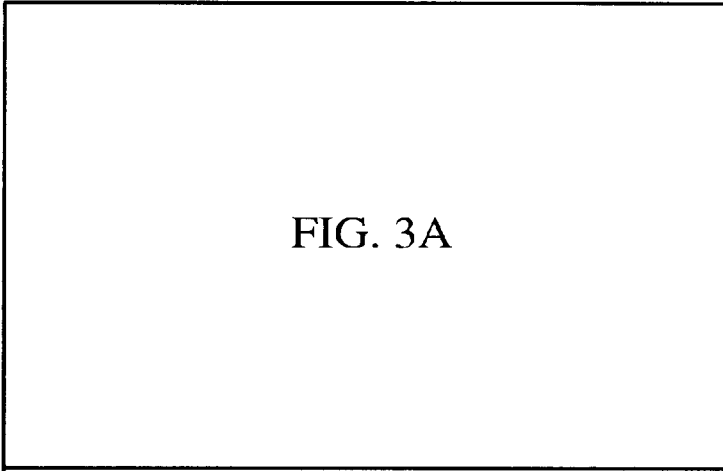
FIG. 3A
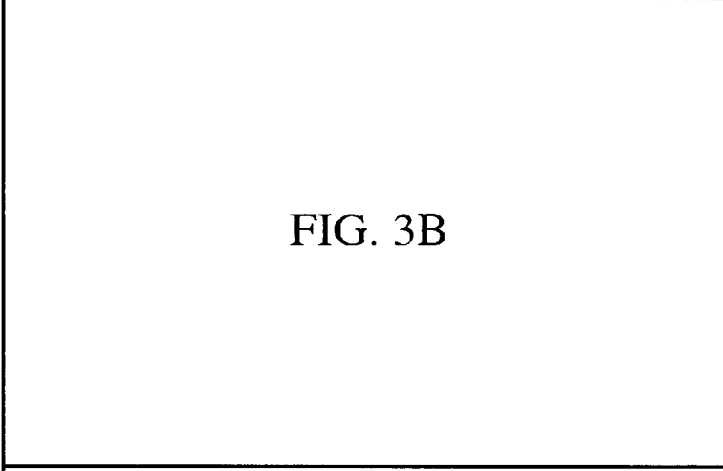
FIG. 3B
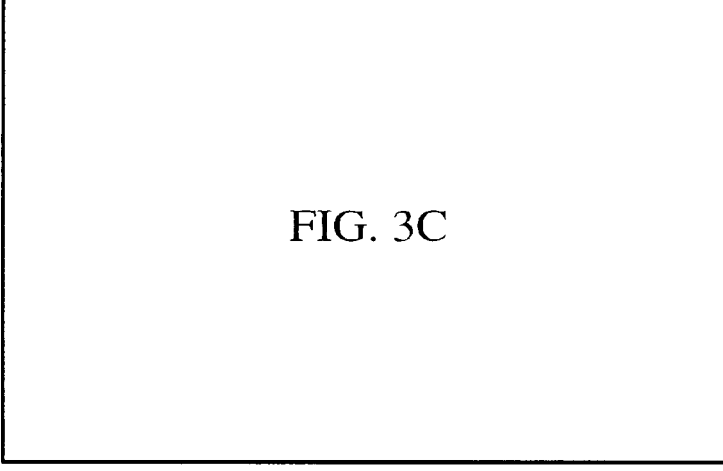
FIG. 3C
FIG. 3

No-Data Control

Control Write

Control Read

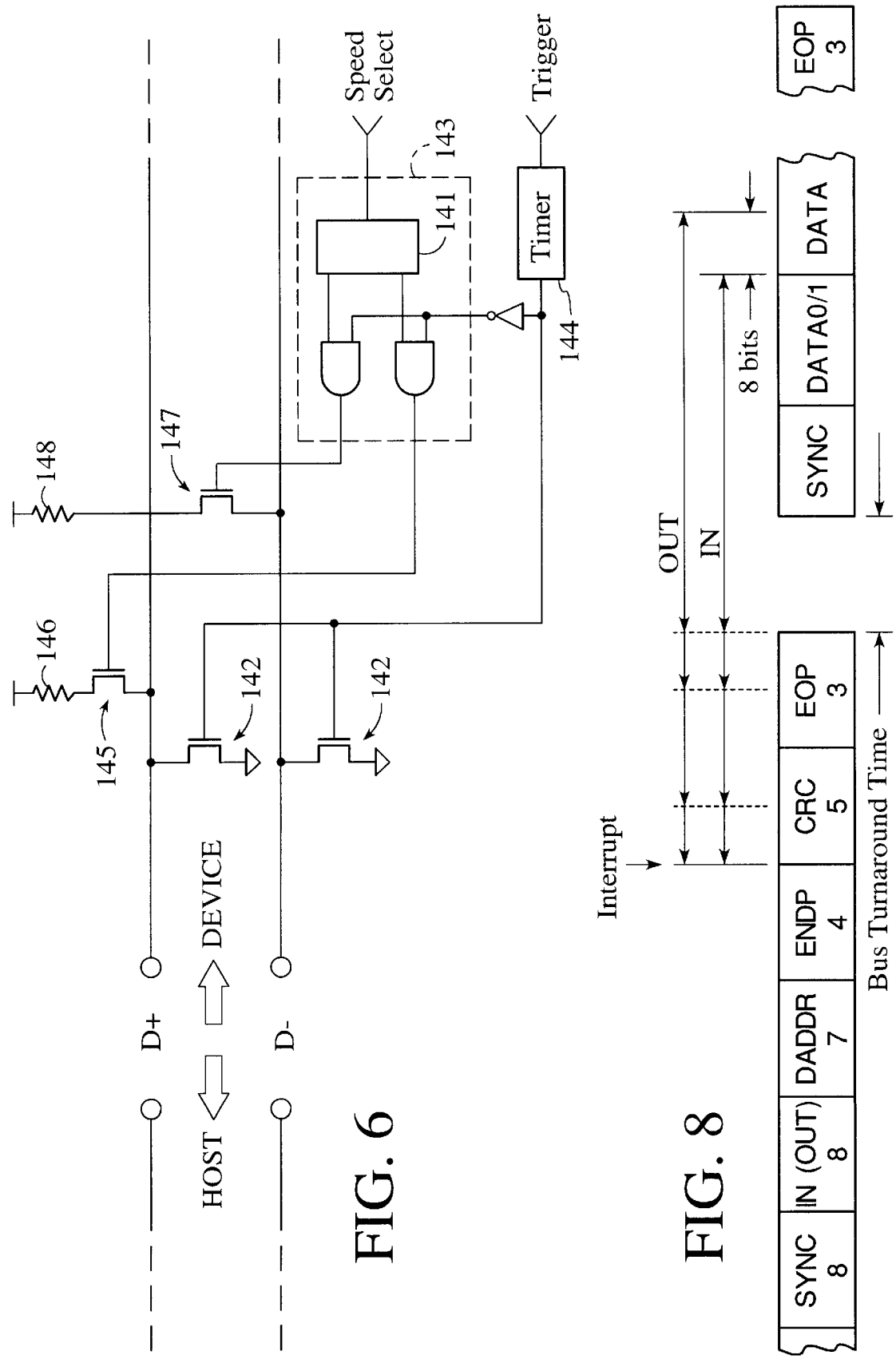

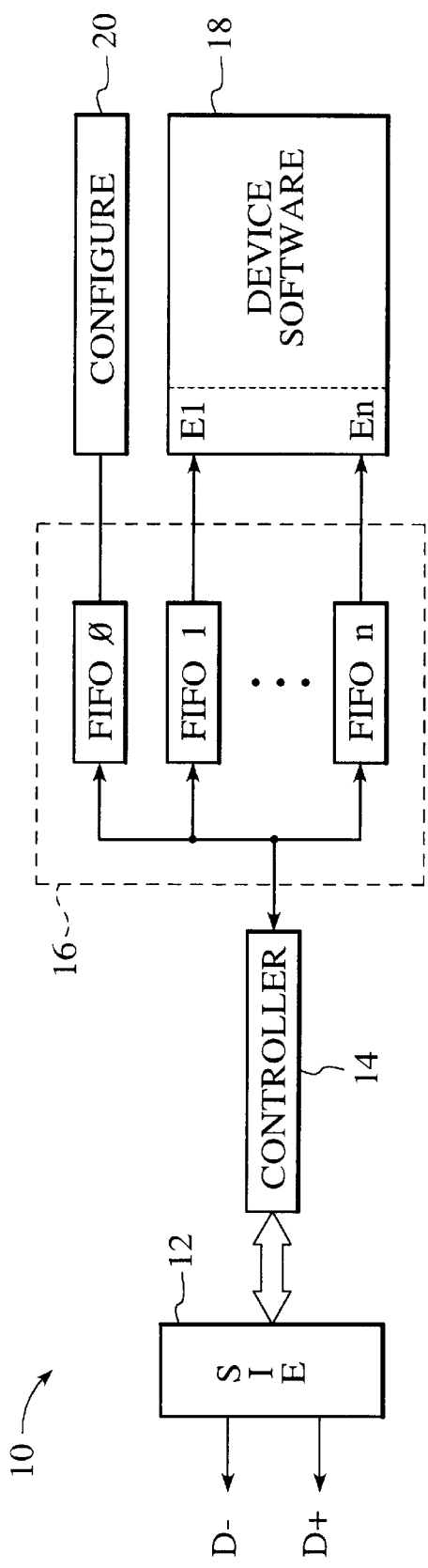
FIG. 10 (PRIOR ART)
FIG. 11B
FIG. 11A

UNIVERSAL SERIAL BUS DEVICE CONTROLLER COMPRISING A FIFO ASSOCIATED WITH A PLURALITY OF ENDPOINTS AND A MEMORY FOR STORING AN IDENTIFIER OF A CURRENT ENDPOINT

TECHNICAL FIELD

The present invention generally relates to device controllers for devices used in conjunction with personal computers, and more specifically to device controllers for devices which operate in accordance with the Universal Serial Bus definition.

BACKGROUND ART

The Universal Serial Bus (USB) specification is an industry-defined interface for connecting peripherals to the system bus of a personal computer. USB features a single interface for a wide variety of peripherals, including mice, keyboards, monitors, printers, mass storage drives, modems, faxes, and the like. This reduces manufacturing costs and makes it easier for personal computer users to configure their systems.

USB uses a token-based bus architecture, similar to other similarly-based buses such as the token ring network. A USB host broadcasts tokens on the bus, and a USB device that matches an address contained in a token responds either by sending data to the host or accepting data from the host.

To enhance the functional versatility, a USB device can support multiple logical channels of communication with the host. In the parlance of the USB specification, such logical channels are referred to as "pipes." Each pipe provides a unidirectional flow of data between a software client resident in the host and an endpoint defined within the device. Functions implemented within the device receive data from the host at their respective endpoint(s), and transmit data to the host by writing to their respective endpoint(s).

A USB device 10 is shown schematically in FIG. 10. Data is communicated over a pair of differentially driven signal lines D+, D−. A serial interface engine (SIE) 12 provides packet generation and decoding, NRZI conversion, CRC generation and verification, and bit stuffing, all in accordance with the USB specification. A controller 14 handles the data flow for the various transactions, namely IN, OUT and SETUP. As shown in FIGS. 11A and 11B, a transaction comprises up to three packets: TOKEN, DATA, and HANDSHAKE. A bus transaction begins with the host issuing a TOKEN-type packet comprising a PID field, an address field which identifies the device, and an endpoint field which identifies a channel within the device. This is followed by a DATA-type packet, flowing in a direction from the addressed device to the host, FIG. 11A, or from the host to the addressed device, FIG. 11B. In the latter case, the data received by the device is stored in a FIFO corresponding to the endpoint identified in the TOKEN packet. The recipient of the data then transmits a HANDSHAKE protocol to the transmitter of the data.

Returning to FIG. 10, typical implementations of a USB device include a bank of n FIFO's 16, allocating one FIFO (FIFO$_1$–FIFO$_n$) for each endpoint E1–En supported by the device software 18. For example, the Intel® x8930Ax USB microcontroller chip defines six endpoints, each having an associated transmit FIFO and receive FIFO. The Cypress CY7C634xx family of controllers appear to support two device addresses: "A" and "B". Device address "A" has three associated endpoints while device "B" has two associated endpoints, each endpoint having a corresponding FIFO. The Xilinx® controller features support for three endpoints, with on-chip FIFO's for each endpoint. A more flexible alternative is one by CAE Technology which offers a function core for FPGAs. The function core features a user definable number of endpoints, and a FIFO for each endpoint having a user definable depth.

Continuing with FIG. 10, the device software 18 provides the functional capabilities of the device. Each functionality communicates with its associated endpoint E1–En, receiving or transmitting data via the FIFOs corresponding to those endpoints. A special endpoint, endpoint 0, is reserved for the purpose of providing access to the device's configuration, status, and control information.

The above-mentioned designs share the common trait in that the number of endpoints possible in a device is fixed. This is true even for the CAE Technology function core. Although the CAE function core provides a user definable number of endpoints, that number is fixed once the design is committed to silicon.

Increasing the number of endpoints in a given design brings up another shortcoming of these design approaches, namely the silicon real estate consumed to support the FIFO's becomes prohibitive since each endpoint requires a FIFO. This is especially true with the INTEL® design where each endpoint is associated with two FIFO's, one for receive and the other for transmit.

What is needed is a controller that, once designed and tested, is capable of supporting any number of endpoints in a device, up to the USB-defined maximum of sixteen. It is desirable that the controller exhibit efficient use of silicon while at the same time be readily configurable to use any number of endpoints.

Another feature of USB is its support for a technique known as bus enumeration, wherein the host identifies and configures a device upon its attachment to the bus. When the device has been detected by the host, the system software interrogates the device, determines its capabilities, assigns a device address, and configures the device. Although USB provides for situations in which a device is no longer able to communicate with the host, it would be desirable for the device to be completely rebooted so that the host can reconfigure the device as if the device had just been attached to the host by a user.

SUMMARY OF THE INVENTION

The present invention is an apparatus and method for operating a device in accordance with the Universal Serial Bus (USB) specification. The invention includes means for receiving packets from a host, and a FIFO for storing data contained in received packets. A packet control store identifies the endpoint contained in a received TOKEN-type packet, referred to as the current endpoint. The data subsequently stored in the FIFO is thus associated with the current endpoint. Upon receiving a second TOKEN packet, the endpoint contained in the packet becomes the new current endpoint. Data that is subsequently stored in the FIFO therefore becomes associated with the second endpoint identifier. By using a single FIFO to support two or more endpoints, silicon area is minimized.

In an alternate embodiment, a second FIFO is provided. The endpoints supported by the device are assigned to one of the first FIFO or the second FIFO. This has the advantage of lessening the processing load of the controller while at the same time limiting the silicon allocated for implementing FIFO's. Since the number of FIFO's used in the present invention is less than the number of supported endpoints, each FIFO can be made deeper than in the case where each endpoint is supported by a corresponding FIFO.

The present invention utilizes a single state machine to control the sequencing of all the USB transaction types between the host and the device. A single, all-purpose state machine permits the endpoints of a device to support every type of data transfer namely control, bulk, interrupt, and isochronous transfers.

Another aspect of the invention improves the speed of operation of the device. This is achieved by accessing the FIFO prior to completion of the transaction requiring the data.

The device controller of the present invention further includes a host-connection port having means for simulating the detachment and attachment of the device. This permits a device which has locked up to automatically re-initiate bus enumeration, thereby causing the host to reconfigure the device as if it had just been physically detached and re-attached by a user without actually having to do so.

BRIEF DESCRIPTION OF THE DRAWINGS

FIG. 2 shows the combination arrangement of FIGS. 2A–2C.

FIG. 3 shows the combination arrangement of FIGS. 3A–3C.

FIG. 6 is a circuit for simulating an attach/detach occurrence.

FIG. 8 shows the data sequence of a transaction.

FIG. 10 schematically illustrates a typical prior art USB controller.

FIGS. 11A and 11B illustrate generic USB-defined data transfers.

BEST MODE OF CARRYING OUT THE INVENTION

Figure 1:
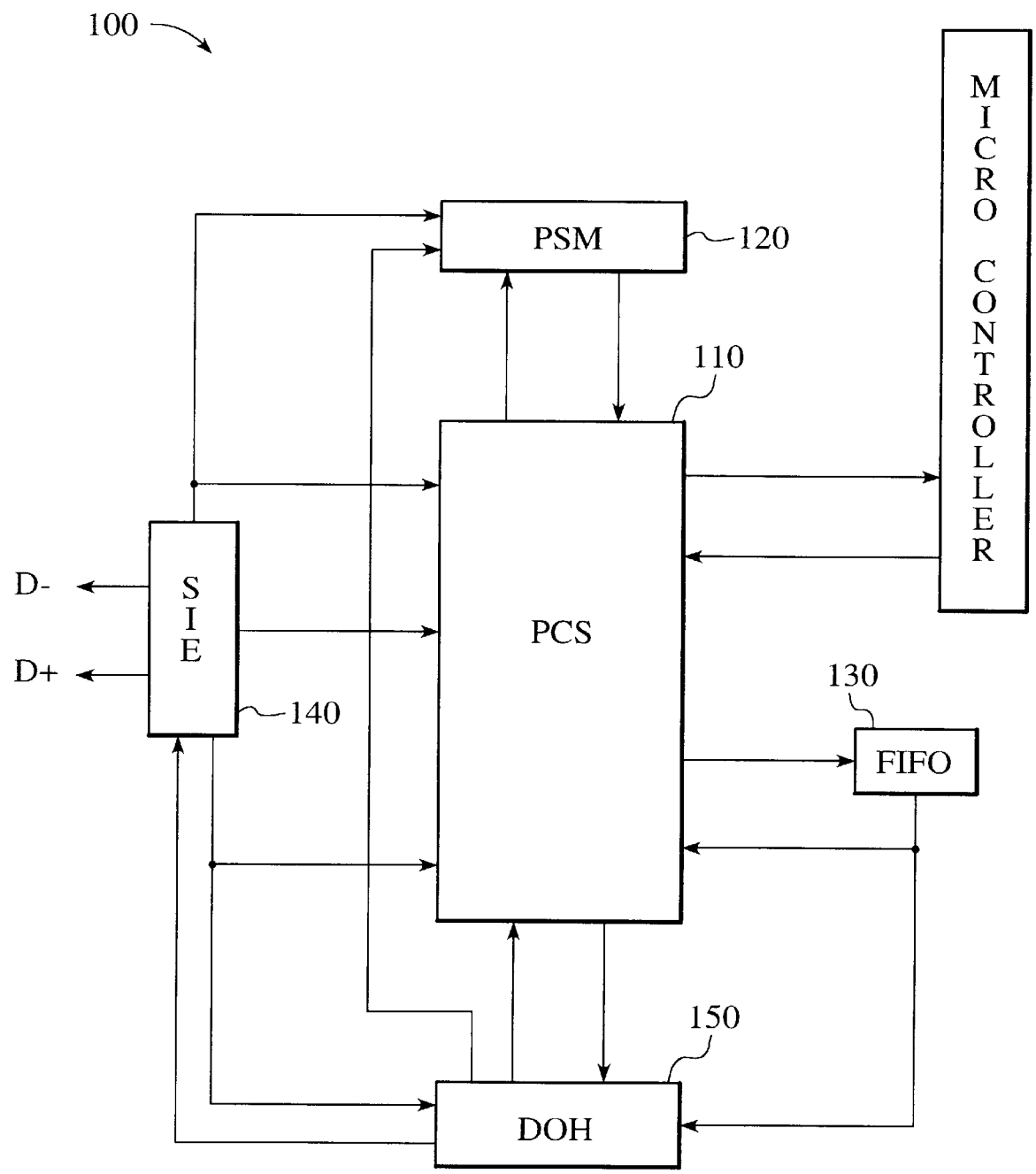
FIG. 1 shows a controller in accordance with the present invention.

Referring to FIG. 1, the USB controller 100 is used in computer peripherals (devices), such as a mouse, a keyboard, a mass storage drive, a digital camera, etc, which communicate over a USB-compliant bus. The controller provides synchronization of transactions between a USB host unit and a multiplicity of endpoints defined for the given device.

In accordance with the invention, the controller 100 includes a protocol control and status (PCS) unit 110 which stores the USB state of the device and provides control during the transfer of data. Transmission of USB data packets is made via a serial interface engine (SIE) 140 which operates in conjunction with a data output and handshake (DOH) module 150. A protocol state machine (PSM) 120 provides sequencing of a transaction between the device and the USB host to which the device is coupled. Received data and data to be transmitted are contained in FIFO 130. The controller 100 includes an interface to a microcontroller which provides the bulk of the functionality in the device.

Figure 2A:
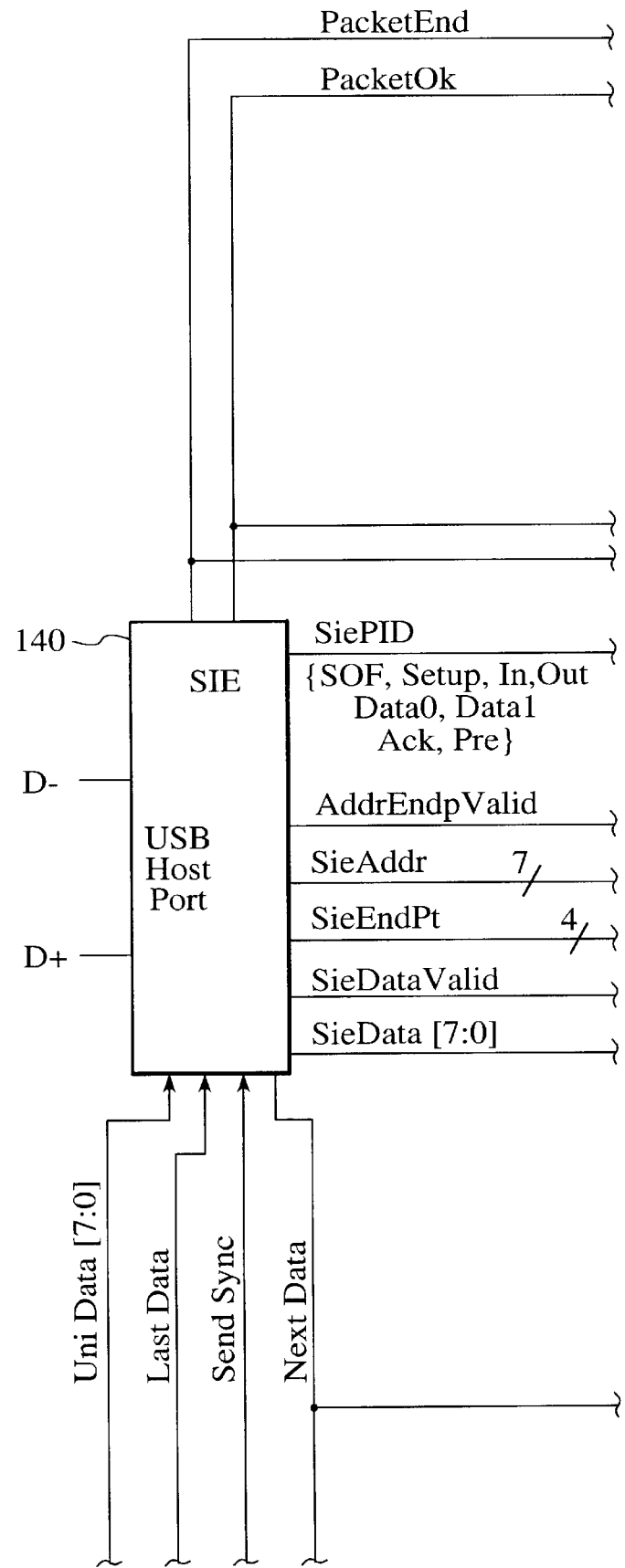
FIGS. 2A–2C comprise a block diagram of the controller.
Figure 2B:
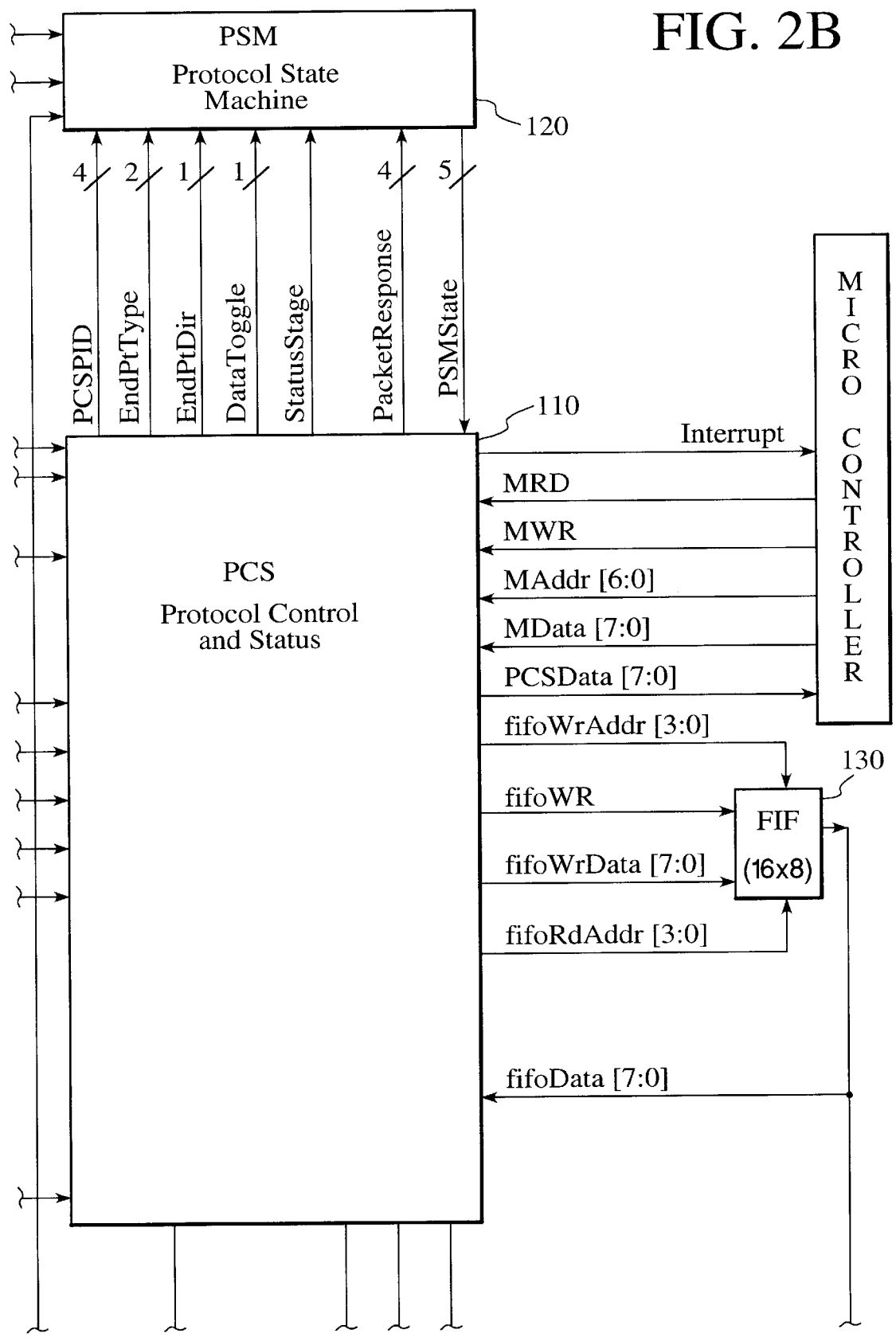
Figure 2C:
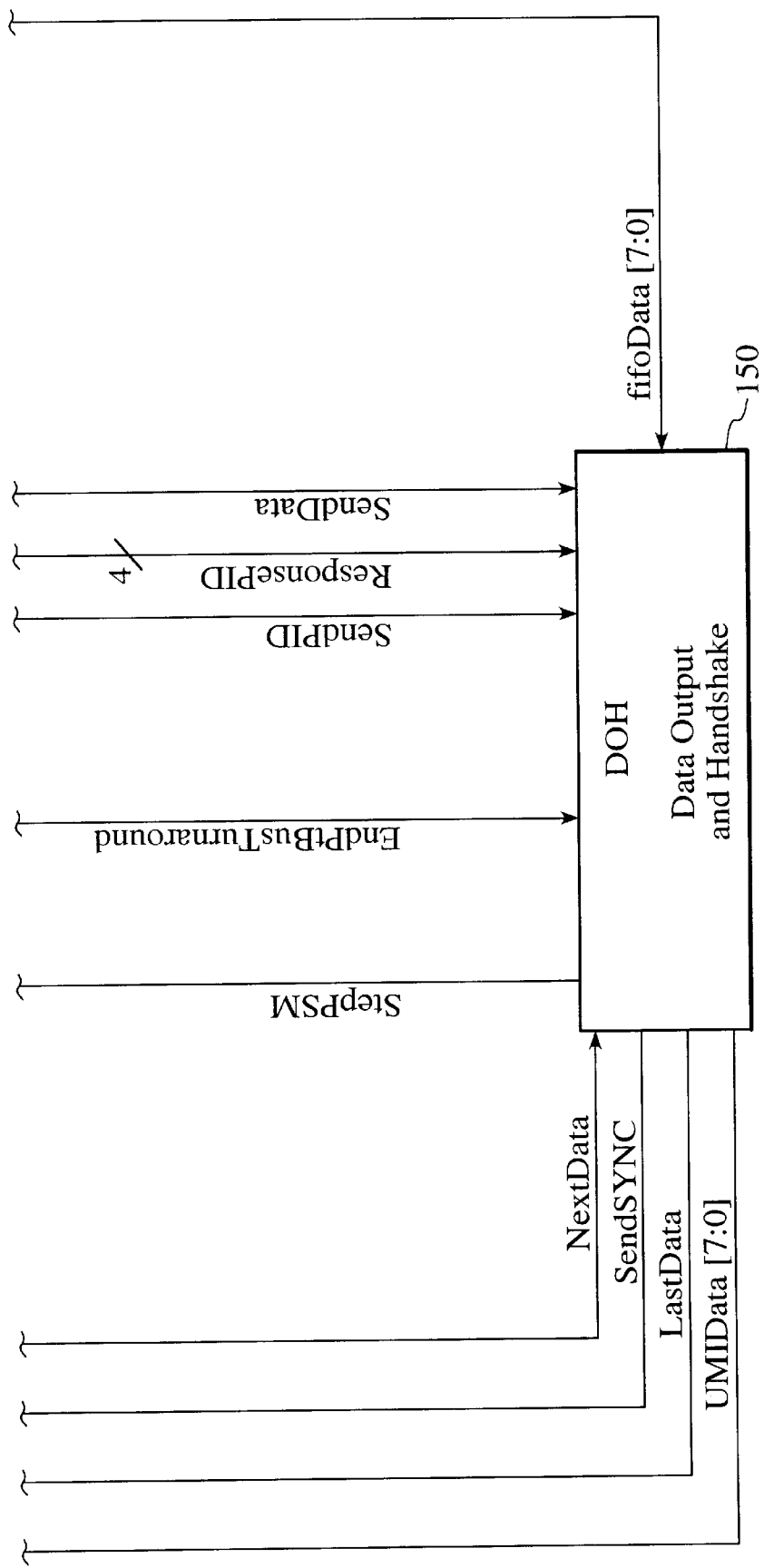

Turning now to FIGS. 2A–2C, the interfaces between modules will be described. Consider first the serial interface engine SIE 140 shown in FIG. 2A. The SIE 140 provides an interface between the USB host and the device. Included is a transceiver circuit (not shown) which drives data onto signal lines D+ and D– and receives data, both in the form of a differential signal. The electrical characteristics of the transceiver are fully defined by the USB specification. The functions of SIE 140 include serializing and deserializing USB transmissions, decoding and encoding of TOKEN-type packets, NRZI encoding and decoding, CRC generation and checking, bit stuffing, and generating the SYNC field.

Upon receiving a valid packet, SIE 140 asserts the PacketOK and PacketEnd signal lines to signal the protocol state machine PSM 120 of the reception of a valid packet from the host. The SIE then extracts the PID (SOF, SETUP, IN, OUT, DATA0/1, ACK) from the received packet and transmits it to PCS 110 via SiePID. A TOKEN-type packet consists of the following: PID (4 bits), device address (7 bits), endpoint address (4 bits), and CRC (5 bits); from which the device address SieAddr and endpoint address SieEndpt are extracted and sent to the PCS. A DATA-type packet consists of: PID, data bytes, and CRC; from which the data is extracted and sent to the PCS one byte at a time over the SieData data lines. Corrupted device addresses and data are detected by CRC validation and checking for bitstuff violations, per the USB specification. Signal lines AddrEndpValid and SieDataValid are asserted to indicate respectively a valid device address and valid data. The NextData signal line, used when transmitting data upstream, indicates that the SIE is ready to receive another byte of data (from DOH 150) for transmission upstream.

Turning for a moment to FIG. 6, a feature of the present invention is shown in an illustration of the host-device interface. The USB specification provides for two speeds of operation: low speed and full speed. A pull-up termination resistor tied to a voltage source between 3.0 V and 3.6 V determines the operating speed. A full speed device is terminated by a pull-up resistor on the D+ line. A low speed device is terminated by a pull-up on the D– line. In accordance with the present invention, each of two grounding transistors 142 has a drain/source coupling between the data lines D+, D– and ground. The grounding transistors 142 are turned on and off through their respective gates by a timer 144, such as a counter, which outputs a LO until it is triggered.

A full speed pull-up resistor 146 is coupled to the D+ line via pass transistor 145, and a low speed pull-up resistor 148 is coupled to the D– line via pass transistor 147. A selector 143 ensures that only one of the two pass transistors is turned on to operate as a full speed device or as a low speed device. FIG. 6 illustrates a typical construction of selector 143, comprising a 1:2 decoder 141 and two AND gates. A SPEED SELECT signal asserts one of the two outputs from decoder 141 to drive the gate of the corresponding pass transistor thus coupling the corresponding pull-up resistor to the data line. The selector 143 is enabled and disabled via timer 144 by feeding the timer output through the AND gates.

When timer 144 is triggered, the output of the timer goes HI to turn on grounding transistors 142, thus taking data lines D+, D− to ground. At the same time, selector 143 is disabled because of the LO input into its AND gates. This has the effect of disconnecting the selected pull-up resistor by virtue of turning off its corresponding pass transistor. Conversely, when the timer times out, the output of timer 144 returns to its LO condition, thus turning off transistors 142. At the same time selector 143 is once again enabled, so that the pass transistor corresponding to the selected speed is turned on. This serves to reconnect the corresponding pull-up resistor to the data line. In this way, the potential on each of the data lines is restored its original level.

If timer 144 is set to provide a delay of at least 2.5 µS, the turning on of grounding transistors 142 and the turning off of pass transistors 145, 147 produce a single-ended zero (SE0) condition which is the device disconnect condition as defined in the USB spec. When the data line (D+, D−) potential is restored by virtue of timer 144 shutting off, a connect condition occurs (per USB). The grounding transistors 142 and pass transistors 145, 147, therefore, provide a means by which an automatic reboot of the device can occur. For example, if the device locks up, a deadman (watchdog) timer in the device can trigger the timer 144 to initiate a disconnect/connect sequence. On detecting the connect condition, the host can reconfigure the device. In a hub application, this reboot feature can be activated to convert between a bus-powered hub and a self-powered hub. The reboot feature would allow the device to change application (e.g. from FAX to scanner and vice-versa). Changes in device descriptors, such as power consumed, suspend delay, etc., can be "uploaded" into the host by the reboot feature, since such information is read by the host only during an enumeration sequence after a connect.

In the preferred embodiment, the circuitry shown in FIG. 6 is incorporated in the front end of SIE 140 of the controller 100. Alternatively, the circuitry may be provided off-chip. The SPEED SELECT signal can be provided in a variety of ways: signaling from the microcontroller, providing jumper options on the PC board, signaling from the USB controller 100. If the device originally boots up at a lower speed, the circuit of FIG. 6 allows for the device to reboot itself to come up at a higher speed. Alternatively, only one pull-up resistor/pass transistor pair can be provided. In such a case, the device speed is fixed to be either a full speed device or a low speed device. In fact, only components 145, 146 are useful in a hub configuration. The selector 143, then would consist simply of an AND gate to couple the timer 144 to the pass transistor. Grounding transistors 142 would still be required to provide the SE0 condition.

Continuing with the discussion of the SIE interfaces, turn to FIG. 2C. The DOH module 150 shown in FIG. 2C sends data to SIE 140 under the control of PCS 110. The SendPID signal line informs the DOH to issue a PID (ACK, NAK, and STALL), provided by PCS 110 via ResponsePID. The SendData signal line signals the DOH to begin transmitting data from the FIFO. When asserted, SendData enables DOH 150 to latch data in from FIFO 130 via the fifoData lines and to send data to SIE 140 via the UMIData lines. operating in conjunction with SendData is the NextData signal line which causes DOH 150 to transmit previously latched data and to latch in new data from the FIFO. As data is received by SIE 140, the CRC is continuously computed. When the PCS de-asserts SendData, the DOH will assert LastData, causing SIE 140 to send the computed CRC and to generate an EOP. The EndPtBusTurnaround specifies the maximum delay before beginning a transmission to the host. This delay varies, depending upon the active endpoint, as will be explained below in connection with FIG. 8. The signal line SendSYNC instructs the SIE to send the SYNC field. The synchronization (SYNC) field precedes all Data packets sent to the host. The DOH also provides a clock signal StepPSM for clocking PSM 120 during sequencing of a transaction.

Turn now to FIG. 2B. The FIFO 130 has a depth of sixteen bytes and stores incoming and outgoing USB data. Data destined for FIFO 130 first is driven onto fifoWrData. Next, the FIFO write address is driven onto fifoWrAddr, followed by asserting the write data line fifoWR. Incoming data from the host is stored via the PCS 110 into the FIFO, where it is subsequently read by the microcontroller. The FIFO can also be written to by the microcontroller, by driving data onto MData, specifying the FIFO address MAddr, and asserting MWR.

Data to be read out of FIFO 130 is addressed via fifoRdAddr and driven on the fifoData lines. From there, the data either is latched into DOH 150 for subsequent transmission by SIE 140 to the host, or taken from fifoData through PCS 110 by the microcontroller via PCSData.

Transfer of data between PCS 110 and the microcontroller occurs over the MData and PCSData lines. Registers within PCS 110 are accessed by asserting their addresses on MAddr, as will be shown below. Input and output of data occurs by asserting MWR and MRD respectively.

Refer now to the protocol state machine also shown in FIG. 2B. PSM 120 operates in conjunction with PCS 110. The PSM provides transaction sequencing for all endpoint types: BULK, CONTROL, INTERRUPT, and ISOCHRONOUS. During sequencing of a transaction for the current endpoint, the PCS communicates to the state machine information related to the endpoint and the state machine responds by informing the PCS what to do. Although the PCS 110 issues the control signals to control the transaction, the master timing originates in the PSM 120.

The PSM is signalled by PacketOK and PacketEnd that SIE 140 has received a valid packet. As will be explained below, this permits the PSM to advance to the next state, per the clocking signal (StepPSM). The PSM receives from PCS 110 the PID name (IN, OUT, SOF, SETUP, DATA0, and DATA1) via PCSPID. Also received from the PCS are: the endpoint type (EndPtType: BULK, ISOCHRONOUS, INTERRUPT, and CONTROL), the data flow direction of the endpoint (EndPtDir), the state of the data toggle bit for the endpoint (DataToggle), a status stage indication (StatusStage) for CONTROL transfers, and a packet response (PacketResponse). These data are used by PSM 120 as state variables in determining the sequencing of a transaction. The output of PSM 120 is control signalling via PSMState which directs the actions of PCS 110 during a transaction.

The PCS 110 provides storage of information concerning the device's USB-related activities, and provides data to the device's microcontroller or other similar controlling hardware. Information contained in the PCS is stored in registers and can originate from the host or the microcontroller, or through state changes while processing a transaction. Following is a list of the registers contained in the PCS, indicating for each register whether it is read/writable by the PCS and whether it is read/writable by the microcontroller:

| Register Address | Register Name | PCS | microcontroller | |
|---|---|---|---|---|
| 0 × 0 | Device Address | R | W | bits 6–0 |
| 0 × 1–0 × 2 | Frame Number | W | R | bits 10–0 |
| 0 × 3 | Global State | W | R/W | bit 0 addressed |
| | | W | R/W | bit 1 configured |
| | | W | R/W | bit 2 rem wakeup |
| | | W | R/W | bit 3 suspend |
| | | W | R/W | bit 4 resume |
| 0 × 4 | Packet Control | W | R | bits 2–0 endp addr |
| | | W | R | bit 3 completed |

-continued

| Register Address | Register Name | PCS | microcontroller | |
|---|---|---|---|---|
| | | W | R | bit 7–4 rcv'd PID |
| 0 × 5 | Packet Response | R | W | bits 3–0 response |
| 0 × 6 | Interrupt Reg | W | R | bit 0 INT |
| | | W | R | bit 1 EOF1 |
| | | W | R | bit 2 EOF2 |
| | | W | R | bit 3 SOF |
| 0 × 7 | Interrupt Ack | R | W | bit 0 INTA |
| | | W | R | bit 1 EOF1 |
| | | W | R | bit 2 EOF2 |
| | | W | R | bit 3 SOF |
| | | W | R | bit 4 STATUS stage |
| 0 × 8 | Interrupt Enable | R | W | bit 0 INT EN |
| | | W | R | bit 1 EOF1 |
| | | W | R | bit 2 EOF2 |
| | | W | R | bit 3 SOF |
| 0 × 9 | - - - unused - - - | | | |
| 0 × A–0 × B | Total Byte Count | W | R | bits 11–0 |
| 0 × C | FIFO Address | R/W | R/W | bits 7–0 |
| 0 × D | Byte Count | W | R | bits 3–0 |
| 0 × E | - - - unused - - - | | | |
| 0 × F | Transaction Response | W | R | bit 0 complete |
| | | W | R | bit error |
| 0 × 10–0 × 17 | Endpoint Control | R | R/W | bits 0–1, endpoint type |
| | | R | R/W | bit 2, data flow direction |
| | | W | R/W | bit 3, DATA 0/1 toggle |
| | | R | R/W | bits 5–4, bus-turn around time select bit 6, - - - unused - - - |
| | | R | R/W | bit 7, enabled flag |
| 0 × 18 | Endpoint Stopped | R | W | bits 7–0 |

The Device Address register contains the device address of the device. It is initialized by the microcontroller during a bus enumeration sequence with the host, and thereafter becomes the device address to which the PCS will respond. More particularly, the host communicates information to the microcontroller during the bus enumeration sequence. The microcontroller then communicates certain of this information to the PCS 110 to write the Device Address register and the Global State register.

The Frame Number register contains the frame number which, in accordance with the USB spec., is incremented by the host at a nominal rate of 1.0 mS. Upon receiving a frame packet, the PCS 110 loads the frame number contained in the packet into the Frame Number register and sets an interrupt (EOF1, EOF2, see below).

The Global State register contains global information regarding the USB state of the device, and is initially written to by the microcontroller. The information is contained in a seven bit data structure, having the following definition: bit 0 indicates whether the device has been given a device address by the host; bit 1 indicates whether the device has been configured; bit 2 indicates whether the device is permitted to signal a host that has entered a power-saving suspend state, thus waking up the host (remote wakeup); bit 3 indicates that the device has entered a power-saving suspend state; bit 4 is written to by the microcontroller in order to initiate a remote wakeup. These bits can be set either by the PCS in response to receiving commands from the host such as during a bus enumeration sequence, or by the microcontroller.

The Packet Control register is written to by the PCS 110, and contains the information for the current endpoint. Included in the seven bit structure are: an endpoint address of the current endpoint (bits 2–0); a packet completed (i.e. received from host) indicator (bit 3); and a packet identifier (PID, bits 7–4). The PID's are defined in the USB spec. and include: OUT (0×1), IN (0×9), SOF (0×5), SETUP (0×d), DATA0 (0×3), DATA1 (0×b), ACK (0×2), and PRE (0×c). These bits are set by the PCS and read by the microcontroller.

The Packet Response register is written to by the microcontroller, and may contain a USB-defined response PID, namely NAK (0×a) and STALL (0×e). In addition, the microcontroller may write certain internal codes which direct the PCS 110 to take certain actions. DAVAIL (0×4) is an internal code indicating to the PCS that there is at least one byte of data in the FIFO 130. DACCEPT (0×6) is an internal code indicating to the PCS that the microcontroller has read out all of the expected data from the FIFO. DEND (0×7) is an internal code indicating to the PCS that the microcontroller has written the last byte to the FIFO or has read the last byte out of the FIFO.

The PCS 110 includes an interrupt line used to interrupt the microcontroller. A set of registers are employed to manage these interrupts. The Interrupt register is written by the PCS, and read by the microcontroller to determine the cause of the interrupt when the interrupt is raised. Bit 0 is set to indicate a generic interrupt (INT) by the PCS. In a hub application, the following additional interrupts are used: bit 1 is set to indicate the end of frame timing point #1 (EOF1); bit 2 is set to indicate the end of frame timing point #2 (EOF2); bit 3 is set to indicate the occurrence of a start of frame (SOF). The Interrupt Ack register is written by the microcontroller to indicate to the PCS that the particular interrupt (INTA, EOF1, EOF2, SOF) has been handled (i.e. the corresponding interrupt routine has completed). Bits 0–3 correspond to bits 0–3 of the Interrupt Register. An additional bit (bit 4) is defined for CONTROL transfers. It is written by the microcontroller to indicate that it is ready to enter the STATUS stage of a CONTROL transfer. The Interrupt Enable register is a masking register for masking one or more of the above-described interrupt types, having the same corresponding bits 0–3.

The Total Byte Count register indicates the number of bytes in a packet received from the host.

The FIFO Address register points to the next entry in the FIFO 130 for data to be transmitted to the host, and for data that has been received from the host.

The Byte Count register indicates the number of bytes currently in the FIFO. This information is updated by the PCS. The register is incremented each time a byte is written into FIFO 130, whether by PCS 110 (via SIE 140) or by the microcontroller. The register is decremented each time a byte is read out of the FIFO, whether by the PCS during an upstream transfer or by the microcontroller.

The Transaction Response register indicates whether the transaction successfully completed or not.

The Endpoint Control registers comprise a set of registers which contain information for each of the endpoints provided by the controller in accordance with the present invention. The current embodiment of the invention supports eight endpoints, addressed 0–7. This number can be increased up to the maximum number defined in the USB spec. for a total of sixteen endpoints. The endpoint type is indicated by bits 0 & 1, namely CONTROL, BULK, INTERRUPT, and ISOCHRONOUS transfers. The direction of the data flow, to the host or from the host, is indicated by bit 2. The DATA toggle bit is stored in bit 3 to maintain data synchronization in accordance with the USB spec. The bus turnaround timing for the endpoint is specified in bits 4

& 5. These timing bits specify one of four possible timing values used by DOH 150, specifying a delay period before beginning a transmission to the host. Bit 6 is unused. Bit 7 is used to indicate, for a given device, whether the endpoint is being used, since the number of endpoints needed for any given device will vary. Bit 7 is written to by the microcontroller on reset.

The Endpoint Stopped register is written by the microcontroller to indicate whether an endpoint is temporarily deactivated. In such a case, any transfers directed to a deactivated endpoint will be ignored by the PCS, and the PCS will respond with a NAK for those transactions which support such a response.

Figure 3A:
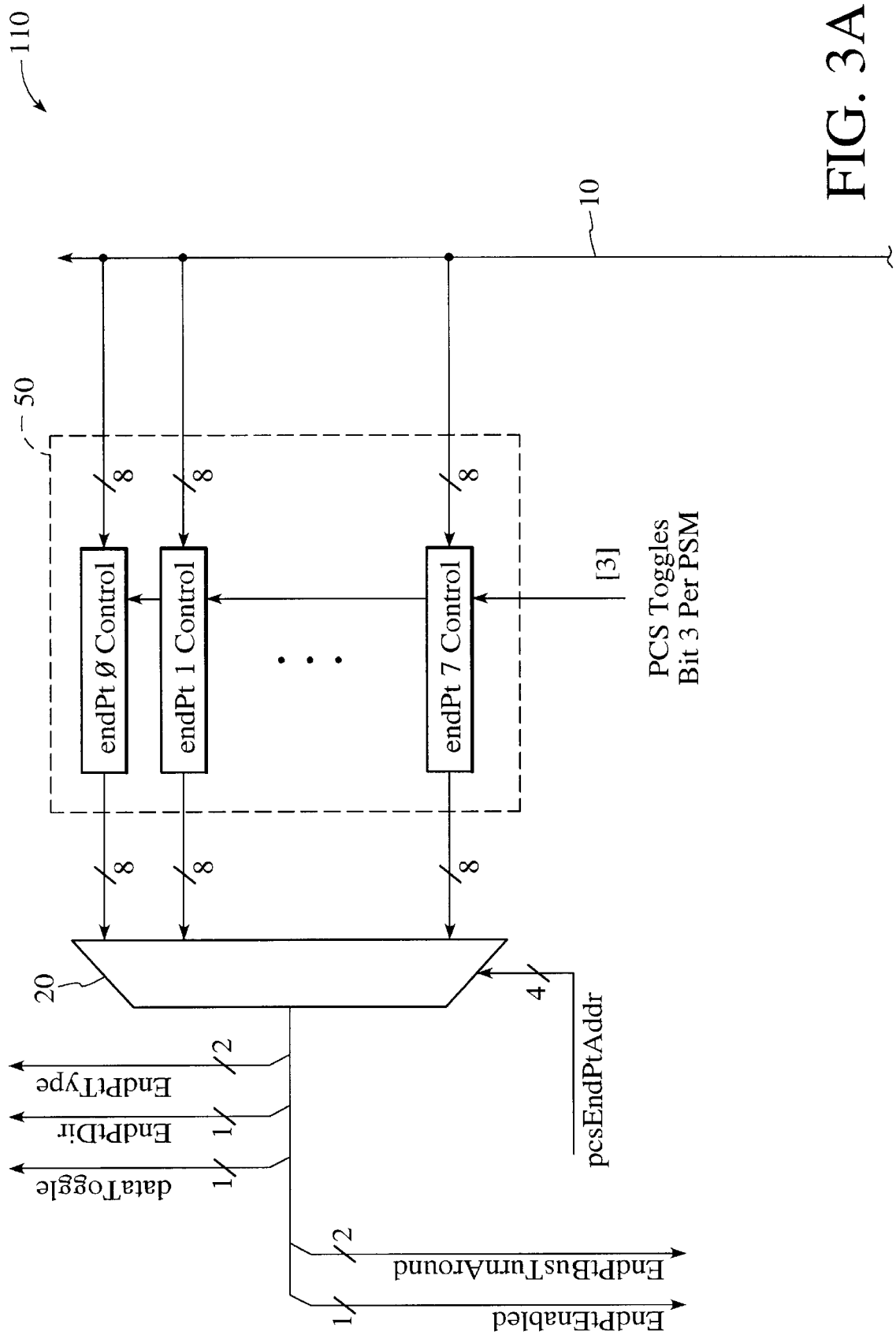
FIGS. 3A–3C illustrate the register organization of the PCS.
Figure 3B:
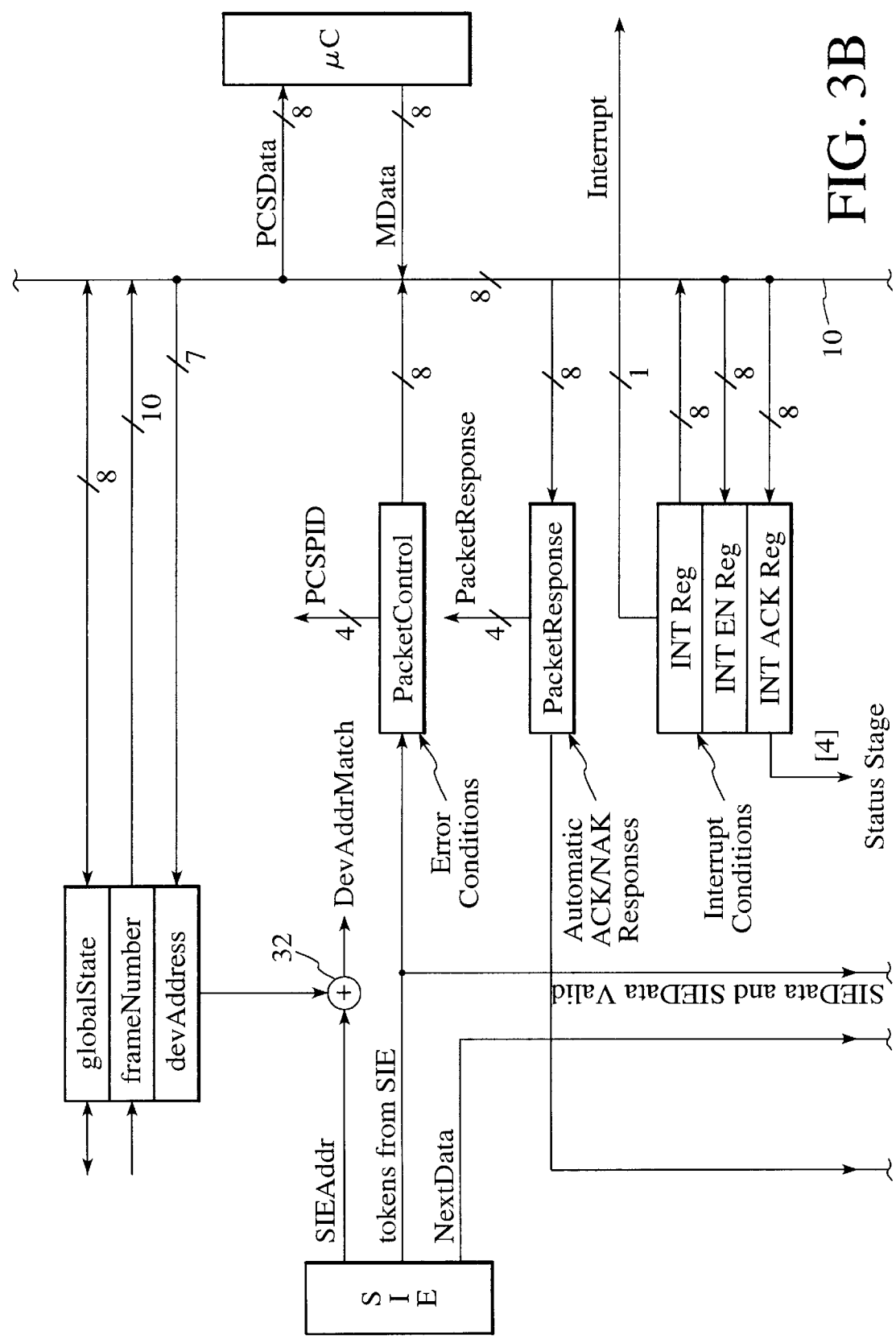
Figure 3C:
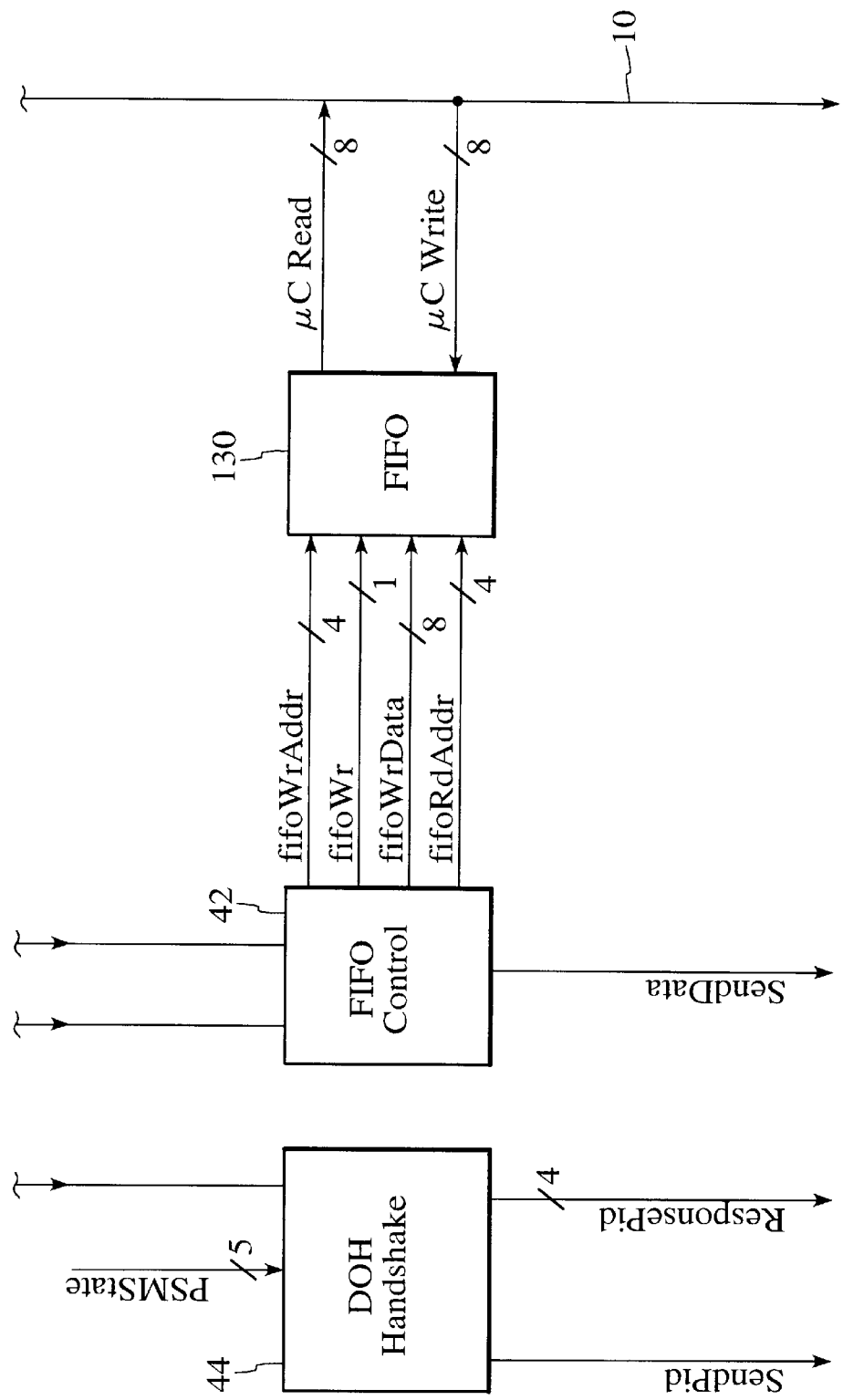

Turn now to the register organization of PCS 110, as shown in the schematic representation of FIGS. 3A–3C. The figures show the various registers described above, including the flow of information between the registers and the other components comprising the USB controller. Information exchange between PCS 110 and the microcontroller takes place over a "bus" 10. In the preferred embodiment, a common design is adopted for implementing bus 10. Reading from the "bus" consists of feeding the output of each register in PCS 110 into a mux (not shown), and using the register address (MAddr, FIG. 2B) as the mux selector to select the desired register. The PCSData bus is taken from the output of the mux. Writing to a register in PCS 110 is accomplished by feeding the data to be written (MData) into the input of each register. Each register has a write enable which is coupled to an output line of a decoder. Thus, by feeding MAddr into the decoder, the corresponding register will be enabled to read in the data.

From SIE 140, SiePID (OUT, IN, SOF, SETUP, DATA0, DATA1, ACK, and PRE) and SieEndPt flow into the Packet Control register of PCS 110. SieAddr flows into comparator 32 (FIG. 3B) to determine if the device address sent from the host matches that contained in the Device Address register of the PCS, producing an enabling signal when a match occurs. Incoming data flows from SieData into FIFO control block 42 (FIG. 3C) to be stored in FIFO 130. NextData signals the FIFO control block 42 to increment to the next FIFO location and to read out its contents.

A bank of endpoint control registers 50 (FIG. 3A) provides an Endpoint Control register for each endpoint. The selection of a register from the register bank 50 is made via selector 20. SieEndPt from SIE 140 constitutes an internal endpoint address identifier PCSEndPtAddr, the current endpoint for the particular transaction. The current endpoint identifier selects the corresponding Endpoint Control register, the contents of which are sent to the state machine 120 and to DOH 150. More specifically, the EndPtType, EndPtDir, and DataToggle information flows into PSM 120, while the EndPtBusTurnaround information flows into DOH 150. Although the present invention controller contemplates a single FIFO, it can be seen that multiple endpoints nevertheless can be supported by only one FIFO because information specific to each endpoint is contained in the register bank 50 and selected via selector 20 using the endpoint specifier provided by the host via SieEndPt. Such information controls the sequencing for that endpoint and its type, and any data that is transferred is accomplished via the FIFO 130. In addition to EndPtType, EndPtDir, and DataToggle, PSM 120 receives StatusStage from bit 4 of the Interrupt Acknowledge register and PacketResponse from bits [3:0] of the Packet Response register. As will be explained below, this information constitutes the state variables used by PSM 120.

PCS 110 operates under the control of PSMState signals during the sequencing of a transaction. For example during a BULK transaction, each transfer requires toggling of the DATA0/1 packet per the USB spec. As shown in FIG. 3A, data toggling involves toggling the data toggle bit (bit 3) of the selected Endpoint Control Register vis-a-vis PCSEndPtAddr by issuing PSMState signals in the PCS. Similarly, the DOH control block 44 is controlled by PSM-State to issue an upstream response PID (i.e. ACK, NAK, STALL) via DOH 150, where the response PID is obtained from the Packet Response register.

Turn now to the transaction diagrams of FIGS. 4A–4I for a brief description of the transaction sequences defined in the USB specification. The transactions defined for USB include: BULK, CONTROL, INTERRUPT, and ISOCHRONOUS. Each of these transactions typically comprise a combination of two or more of the basic data transfers (FIGS. 4A–4E) to be discussed below.

Figure 4A:
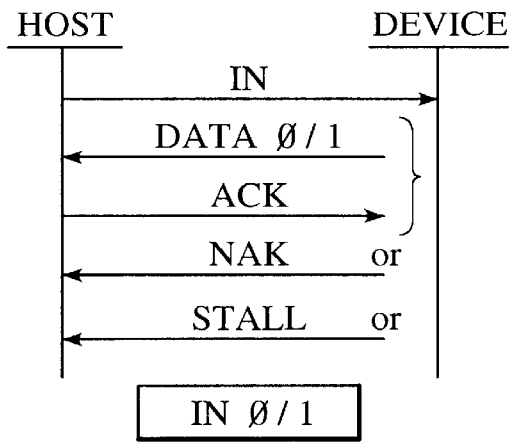
FIGS. 4A–4I show transaction diagrams of the USB-defined transactions.

FIG. 4A illustrates the transaction sequence for an IN-type data transfer, involving the transmission of data to the host. This type of data transfer is common to the BULK, CONTROL, and INTERRUPT transfers. The host sends an IN-type packet to the device. In response, the device will send a DATA packet to the host, which is acknowledged by a return ACK to the device. As shown in FIG. 4A, the device alternatively may respond with either a NAK or a STALL, if the device experiences a problem.

Figure 4B:
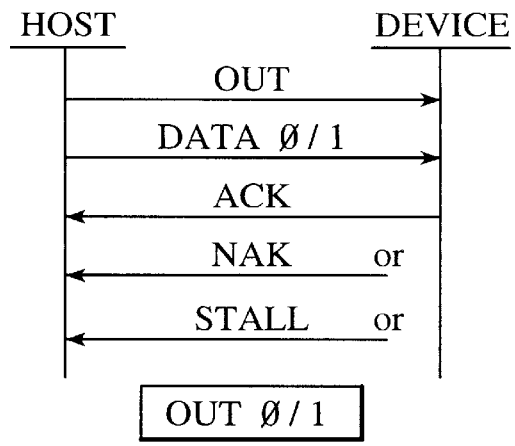

FIG. 4B shows a similar sequence for an OUT-type data packet, involving transmission of data from the host. The host sends an OUT-type packet followed by a DATA packet. The device then responds by an ACK, a NAK, or a STALL, depending on the success, delay or failure of the transaction.

A BULK transfer of data (whether from the device or to the device) comprises one or more IN- or OUT-type data transfers. For example, FIG. 4F shows a BULK read transaction comprising a plurality of IN data transfers (FIG. 4A) for transmitting data to the host. The zero and one notation denotes the alternation of DATA0 and DATA1 packets for each successive data transfer in accordance with the bit toggling scheme defined in the USB specification. A BULK transfer of data may go in the other direction, namely from the host into the device, accomplished with a series of OUT-type data transfers (FIG. 4B).

An INTERRUPT transaction (not shown), not unlike a BULK transfer, consists of one or more IN-type data transfers (FIG. 4A). Where more than one data transfer is required, bit toggling occurs for successive transfers. Unlike BULK transfers, an INTERRUPT involves only the transfer of data from the device to the host; i.e. IN-type data transfers.

Figure 4C:
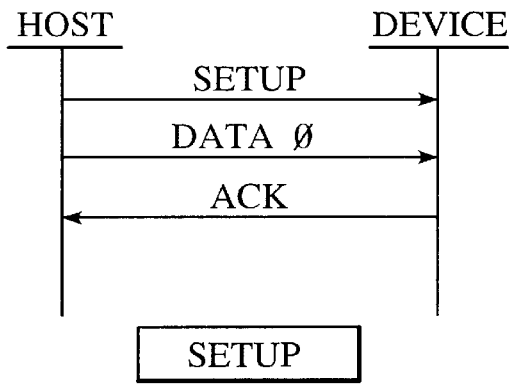

FIG. 4C shows a SETUP-type data transfer. This includes a SETUP packet sent by the host, followed by a DATA packet also sent by the host. This type of data transfer is used during a CONTROL transaction, which begins with a setup stage, optionally followed by a data stage, and ending with a status stage. FIG. 4G depicts one variation of the CONTROL transaction, consisting only of a setup stage (SETUP-type data transfer) and a status stage (IN-type data transfer, FIG. 4A). FIGS. 4H and 4I show a second variation of the CONTROL transaction which includes a data stage, comprising one or more IN or OUT data transfers. The status stage is indicated by a data transfer in the opposite direction.

Figure 4D:
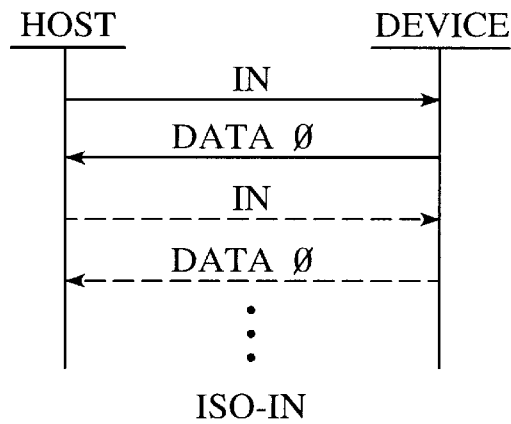
Figure 4E:
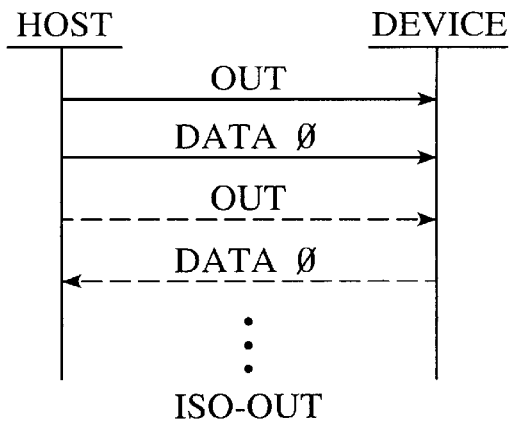
Figure 4F:
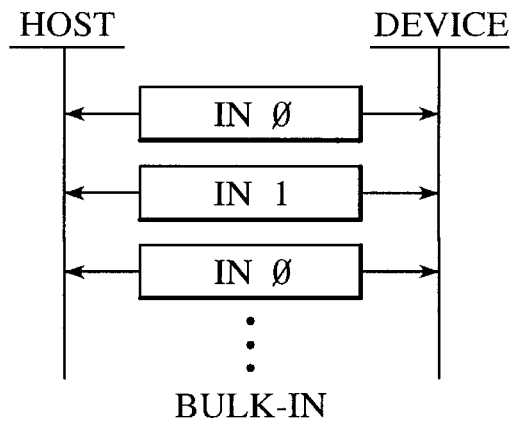
Figure 4G:
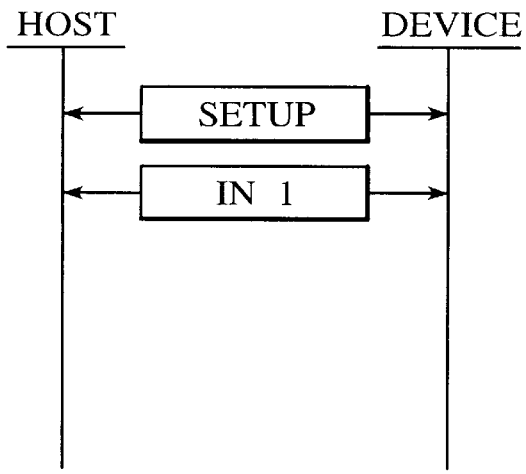
Figure 4H:
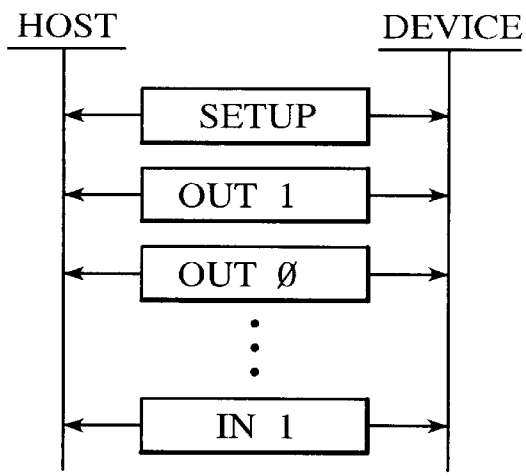
Figure 4I:
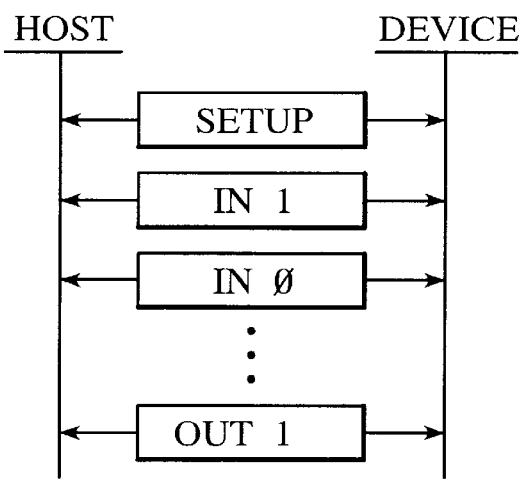

FIGS. 4D and 4E show the transaction sequences for an ISOCHRONOUS transaction. For the upstream ISO transaction shown in FIG. 4D, the host sends an IN-type packet. The device responds by sending a DATA packet. The amount of data transferred during an ISO transaction may require more than one such transaction, and so additional transactions (shown in phantom) may occur, with bit toggling. FIG. 4E shows a similar sequence, but for a downstream ISO transaction. Unlike, the other transfer types, ISO transfers are not terminated by a handshake phase.

Having discussed the various USB-defined transactions, refer now to the protocol state machine PSM 120 illustrated in FIGS. 5A–5D. Recall that the PSM provides sequencing for all of the USB defined transactions. The inputs to PSM 120 (PacketEnd, PacketOK, PCSPID, EndPtType, EndPtDir, DataToggle, StatusPhase, and PacketResponse) serve as state variables of the state machine, determining the action(s) taken during each state. The output of PSM 120 is PSMState, a set of control lines for signalling PCS 110.

Figure 5:
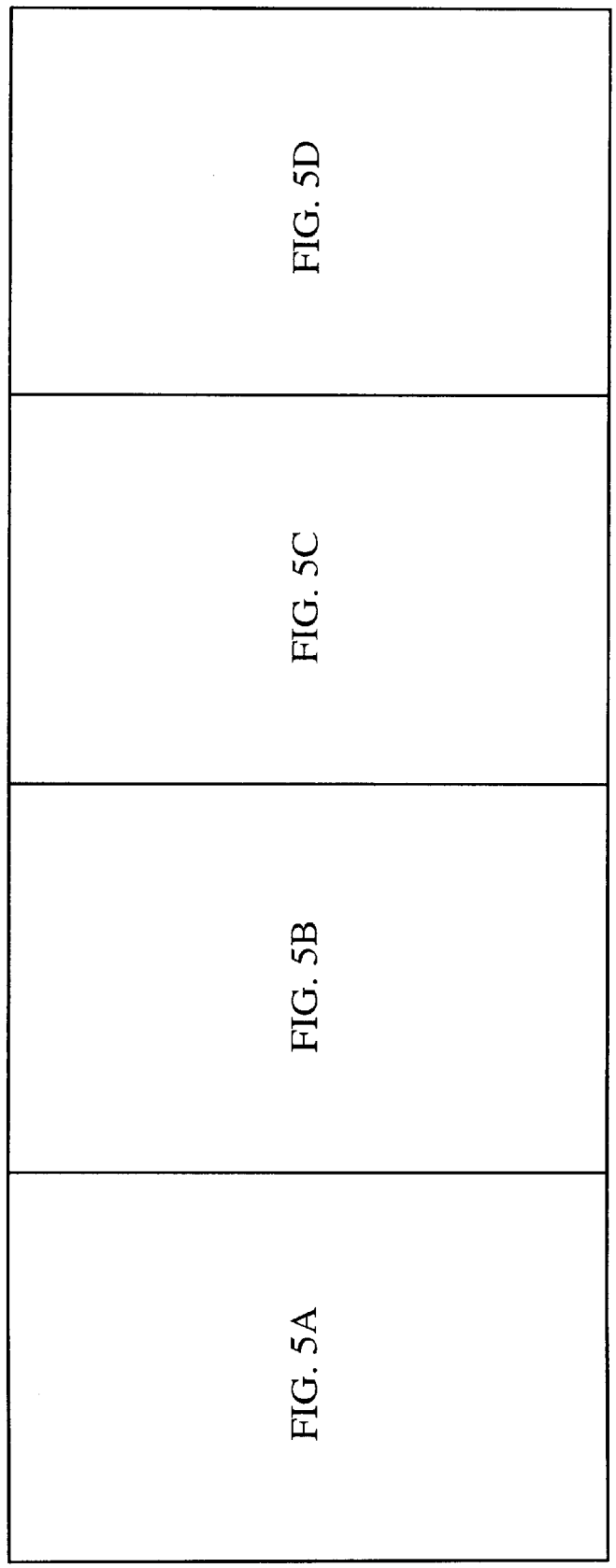
FIG. 5 shows the combination arrangement of FIGS. 5A–5D.
Figure 5A:
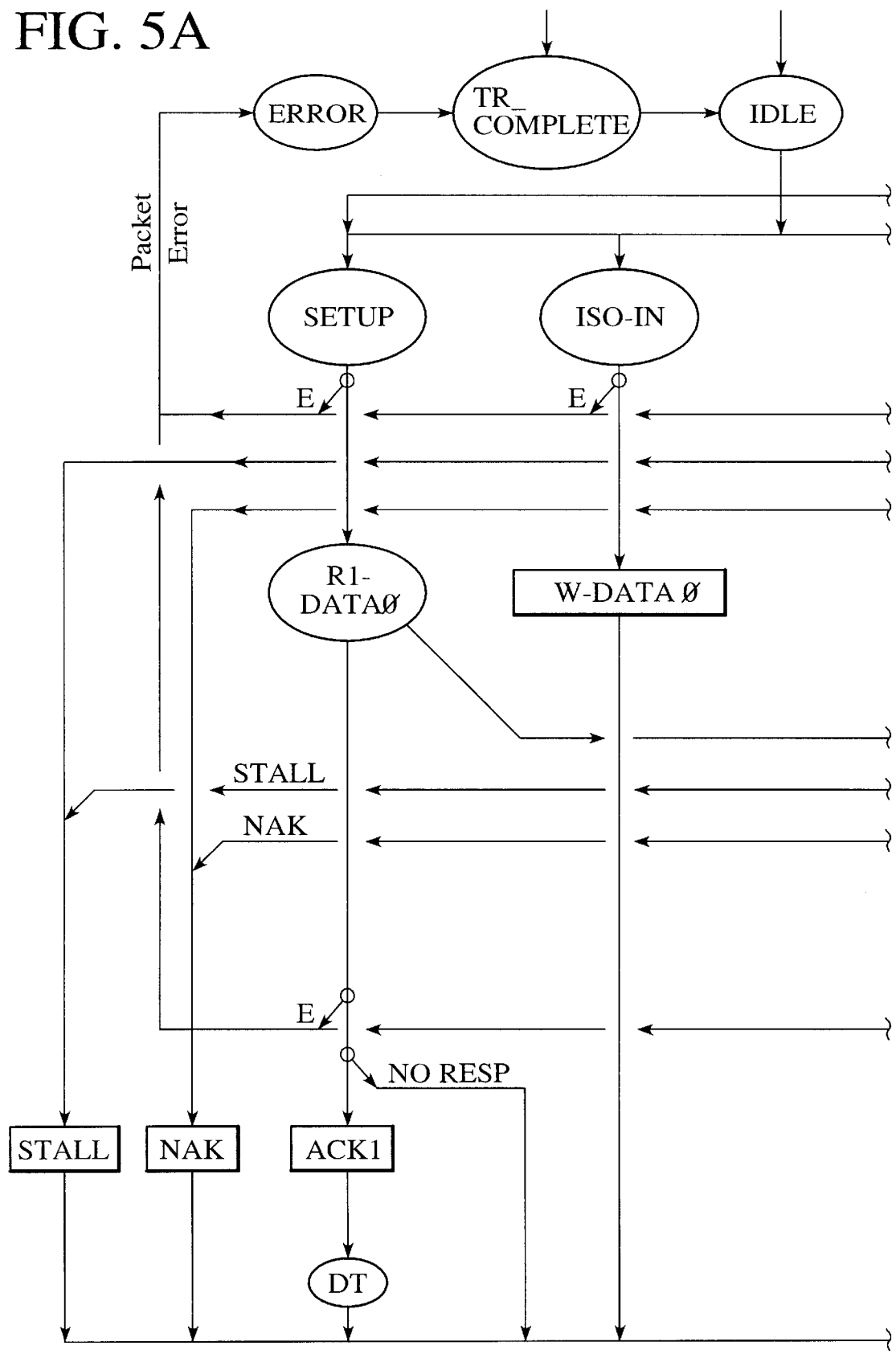
FIGS. 5A–5D are a state diagram of the protocol state machine.

From the IDLE state shown in FIG. 5A, PSM 120 transitions to one of the starting data transfer states: SETUP, ISO-IN, ISO-OUT, ST-IN, ST-OUT, INT-IN, IN, and OUT. The SETUP state is entered for the SETUP stage of a CONTROL transaction. The ISO-IN (ISO-OUT) state is entered for isochronous transactions of data to (from) the host. The ST-IN (ST-OUT) state is entered for the STATUS stage of a CONTROL write (read) sequence. The INT-IN state is entered for transactions involving interrupt-type endpoints. The IN (OUT) state is entered for IN (OUT) type transfers during BULK and CONTROL transactions. The transitions are fully defined by and are in accordance with the USB specification. The error, NAK, and STALL transitions are also per the USB specification.

A transition from the IDLE state occurs when PacketOK and PacketEnd are asserted by SIE 140. The starting state (SETUP, ISO-IN, ISO-OUT, ST-IN, ST-OUT, INT-IN, IN, OUT) to which the transition occurs is based on the PCSPID input from PCS 110. A subsequent transition out of the starting state occurs when SIE 140 receives the next packet and again asserts PacketOK and PacketEnd. The PSM then issues a signal via PSMState, indicating to the PCS what action is needed. Subsequent transitions are then initiated when DOH 150 asserts StepPSM.

State transitions occur on the basis of the PSM state variables provided at the PCS 110 interface. Following is a summary of what state variables are looked at and what action(s) taken for each state. While the PSM 120 is implemented in digital logic, the description which follows is provided in a pseudo-code format to facilitate the explanation of FIGS. 5A–5D. Given the following summary, it is a matter of basic principles in logic design, understood and known by those of ordinary skill in the art, to implement a state machine having the described behavior:

---

IDLE state (FIG. 5A):

o wait for PacketOK & PacketEnd
o if PCSPID == SETUP & EndptType == CONTROL, then go to SETUP state
o else if PCSPID ==IN & EndptType == ISOCHRONOUS, then go to ISO-IN state
o else if PCSPID == OUT & EndptType == ISOCHRONOUS, then go to ISO-OUT state
o else if PCSPID == IN & EndptType == CONTROL & !StatusStage, then go to ST-IN state
o else if PCSPID == OUT & EndptType == CONTROL & !StatusStage, then go to ST-OUT state
o else if PCSPID == IN & EndptType == CONTROL & !StatusStage, then go to IN state
o else if PCSPID == OUT & EndptType == CONTROL & !StatusStage, then go to OUT state
o else if PCSPID == IN & EndptType == INTERRUPT, then go to INT-IN state
o else if PCSPID == IN & EndptType == BULK, then go to IN state
o else if PCSPID == OUT & EndptType == BULK, then go to OUT state
o else go to IGNORE PACKET state SETUP state (FIG. 5a):

o if PacketEnd & !PacketOK, then go to ERROR state
o else go to R1-DATA0 state

ISO-IN state (FIG. 5A):

o if PacketEnd & !PacketOK, then go to ERROR state
o else go to W-DATA0 state

ISO-OUT state (FIG. 5B):

o if PacketEnd & !PacketOK, then go to ERROR state
o else go to R2-DATA0 state

ST-IN state (FIG. 5B):

o if PacketEnd & !PacketOK, then go to ERROR state
o else if PacketResponse == NAK, then go to NAK state
o else go to W-DATA1 state ST-OUT state (FIG. 5B):

o if PacketEnd & !PacketOK, then go to ERROR state
o else go to R-DATA1 state

INT-IN state (FIG. 5C):

o if PacketEnd & !PacketOK, then go to ERROR state
o else if PacketResponse == DAVAIL, then go to W-DATAT state
o else if PacketResponse == NAK, then go to NAK state
o else if PacketResponse == STALL, then go to STALL state
o else go to IDLE state IN state (FIG. 5C):

o if PacketEnd & !PacketOK, then go to ERROR state
o else if PacketResponse == NAK, then go to NAK state
o else if PacketResponse == STALL, then go to STALL state
o else go to W-DATAT state OUT state (FIG. 5C):

o if PacketEnd & !PacketOK, then go to ERROR state
o else go to R-DATAT state

R1-DATA0 state (FIG. 5A):

o if PCSPID != DATA0 PID, then go to EARLY SETUP state
o else PSMState = read data
o wait for PSMStep signal
o if (PacketEnd & !PacketOK), then go to ERROR
o go to ACK1 state // to send Ack to host W-DATA0 state (FIG. 5A):

o PSMState = send data with DATA0 PID
o wait for PacketResponse == DEND
o PSMState = set completion bit
o go to IDLE state R2-DATA0 state (FIG. 5B):

o if PCSPID != DATA0 PID, then go to EARLY SETUP state
o wait for PacketResponse == DACCEPT
o if PacketEnd & !PacketOK, then go to ERROR state
o PSMState = set completion bit
o go to IDLE state W-DATA1 state (FIG. 5B):

o PSMState = send data to host with DATA1 PID
o wait for PSMStep signal
o if PacketResponse == NAK, then go to NAK state
o else if PacketResponse == STALL, then go to STALL state
o else go to ACK4 state R-DATA1 state (FIG. 5B):

o if PCSPID != DATA1 PID, then go to EARLY SETUP state
o else PSMState = read data
o wait for PSMStep signal
o if PacketResponse == NAK, then go to NAK state
o else if PacketEnd & !PacketOK, then go to ERROR state
o else go to ACK2 state W-DATAT state (FIG. 5C):

o if DataToggle == "0", PSMState = send data using DATA0
o else PSMState = send data using DATA1
o if PacketResponse == NAK, then go to NAK state
o else if PacketResponse == STALL, then go to STALL state
o else go to ACK5 state, after sending all data (PacketResponse == DATA END)

R-DATAT state (FIG. 5C):

o if toggle bit in PCSPID == SETUP, then go to EARLY SETUP state
o else PSMState = read data
o wait for PSMStep signal
o if PacketResponse == NAK, then go to NAK state
o else if PacketResponse == STALL, then go to STALL state
o if PacketEnd & !PacketOK, then go to ERROR state
o else go to ACK3 state ACK1 state (FIG. 5A):

o PSMState = send ACK
o wait for PSMStep signal
o go to DT state

ACK2 state (FIG. 5B):

o PSMState = send ACK
o wait for PSMStep signal
o go to DR state

ACK3 state (FIG. 5C):

o PSMState = send ACK
o wait for PSMStep signal
o if PCSPID matched DataToggle in R-DATAT, then go to DT State
o else go to IDLE state ACK4 state (FIG. 5B):

o if PCSPID != ACK, then go to ERROR state
o else if PCSPID == SETUP, then go to EARLY SETUP state
o if PCSPID == ACK, then go to DR state
o else go to ERROR state -continued ACK5 state (FIG. 5C):

o if PCSPID != ACK, then go to ERROR state
o else if PCSPID == SETUP, then go to EARLY SETUP state
o else go to DT state after receiving ACK from host
DR state (FIG. 5B):

o PSMState = clear toggle bit
o wait for PSMStep signal
o PSMState = set completion bit
o go to IDLE state
DT state (Figs. 5A, 5C):

o PSMState = toggle bit
o wait for PSMStep signal
o PSMState = set completion bit
o go to IDLE state
EARLY SETUP state (FIG. 5D):

o if PCSPID == SETUP, then go to SETUP
o else go to IGNORE PACKET state
ERROR state (FIG. 5A):

o PSMState = set transaction error bit in transaction response register
o go to IDLE state
NAK state (FIG. 5A):

o PSMState = send NAK
o go to IDLE state
STALL state (FIG. 5A):

o PSMState = send STALL
o go to IDLE state
IGNORE PACKET state (FIG. 5D):

o Wait for PacketEnd and go to IDLE state
TR_COMPLETE STATE (FIG. 5A):

o set completion bit in Transaction Response register
o go to IDLE state

Figure 7:
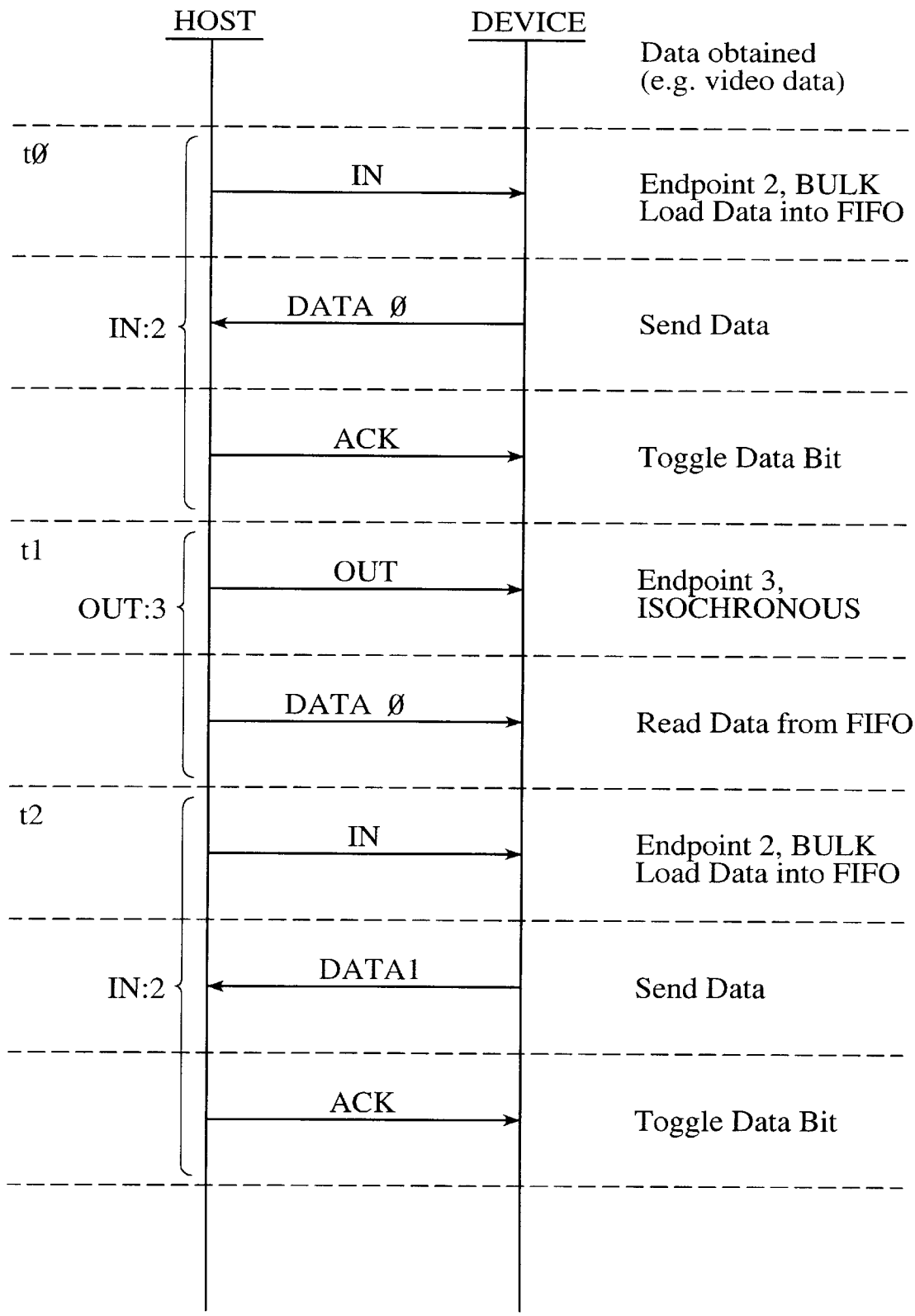
FIG. 7 illustrates a typical sequence of host/device transactions.
Figure 9:
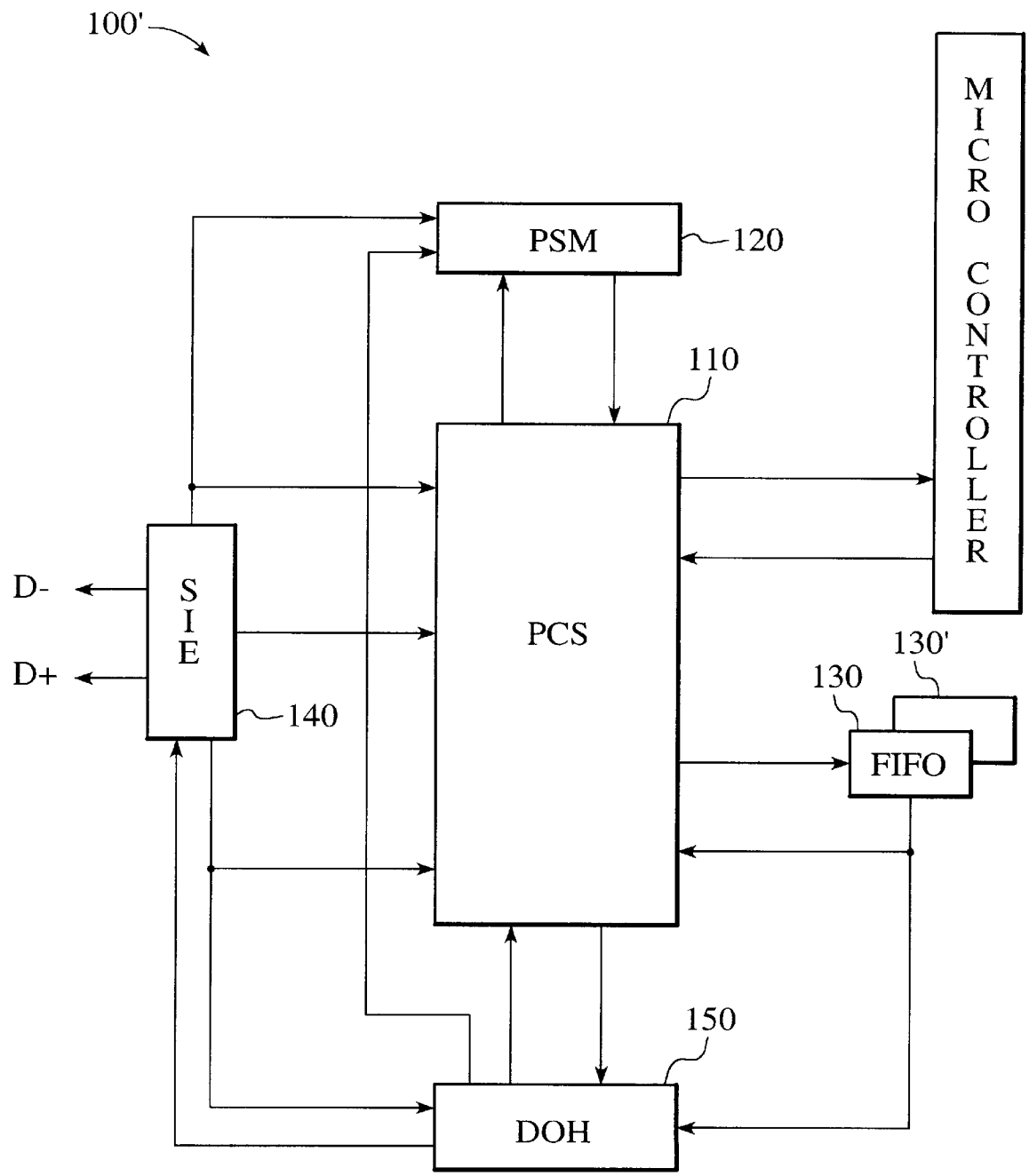
FIG. 9 shows a variation of the preferred embodiment.

The operation of the controller will now be discussed in connection with two transactions shown in FIG. 7, illustrating how the controller handles multiple endpoints using a single FIFO. Assume endpoint 2 is defined for upstream BULK transfers and endpoint 3 is defined for downstream ISOCHRONOUS transfers. Assume further that the bulk transfer is time-wise interleaved with the isochronous transfer.

Suppose, at some time prior to time t0, the microcontroller obtains data to be uploaded to the host; e.g. a video camera peripheral device has captured an image and is ready to send it to the host. Assume that the transmission of the video image to the host requires two packets of data.

At time t0, SIE 140 receives an IN packet for endpoint address 2 from the host. The device address is passed into PCS 110 and matched against the content of the Device Address register. The endpoint address is passed into PCS 110, causing selector 20 to select the Endpoint Control register corresponding to endpoint 2. The PID of the received packet is stored in the Packet Control register. PCS 110 initializes the PSM with the following endpoint-related information: EndPtType=BULK, EndPtDir="0" for upstream transfers, and DataToggle="0".

The microcontroller is interrupted and determines (via the Packet Control register) that an IN packet for endpoint 2 was received. The microcontroller begins to load data in to FIFO 130. Meanwhile, PSM 120 begins operating when SIE 140 asserts PacketOK and PacketEnd, resulting in a transition from the IDLE state to the IN state (FIG. 5C). This is followed by a transition to the W-DATAT state. In the W-DATAT state, PSM 120 signals the DOH controller 44 in PCS 110 via PSMState to send data contained in FIFO 130 to the host. More specifically, the PSM looks at DataToggle ("0") and signals the PCS to send DATA0.

SIE 140 provides subsequent clocking (NextData) for outputting each byte to be sent. When the last byte has been written into FIFO 130, the microcontroller informs PCS 110 of the fact by writing a DEND (0x7) internal code into the Packet Response register. When the FIFO is empty, PCS 110 deasserts SendData. DOH 150 asserts LastData, signalling SIE 140 to send the computed CRC upstream. DOH 150 then asserts PSMStep, causing PSM 120 to transition from W-DATAT state to the ACK5 state. Next, PSM checks if the host sent an ACK, at which point a transition to DT state occurs. Upon entering DT state, PSM 120 signals PCS to toggle the DATA toggle bit of the Endpoint Control Register corresponding to endpoint 2, and then transitions to the IDLE state.

At this point, one packet of the video data has been sent to the host. At a later time t1, the SIE receives an OUT packet for endpoint address 3. Again, the device address is passed into PCS 110 and matched against the content of the Device Address register. The endpoint address is passed into PCS 110, causing selector 20 to select the EndPoint Control register corresponding to endpoint 3. The PID of the received packet is stored in the Packet Control register. PCS 110 initializes the PSM with the following endpoint-related information: EndPtType=ISOCHRONOUS, EndPtDir="1" for upstream transfers, and DataToggle="0".

Figure 5B:
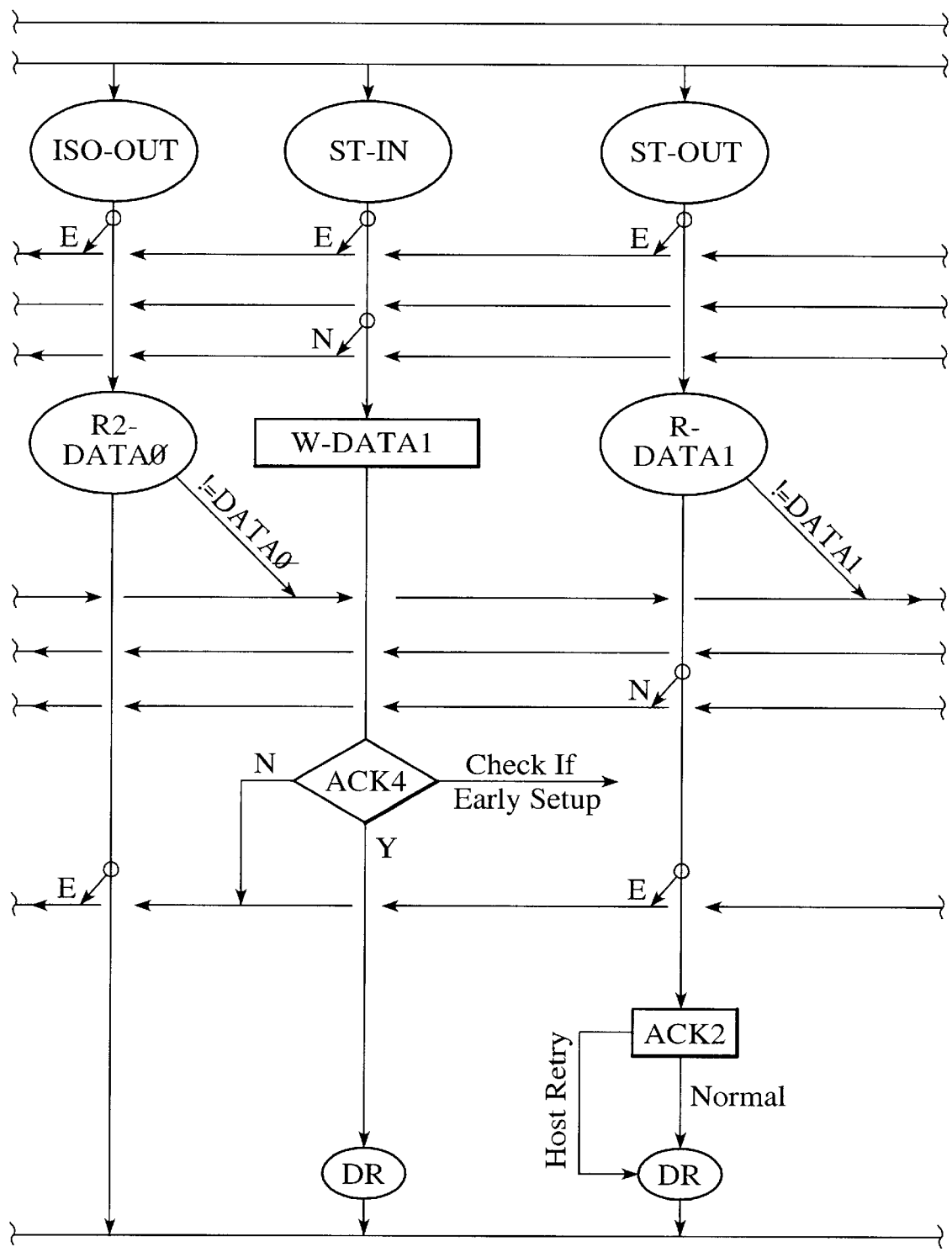
Figure 5C:
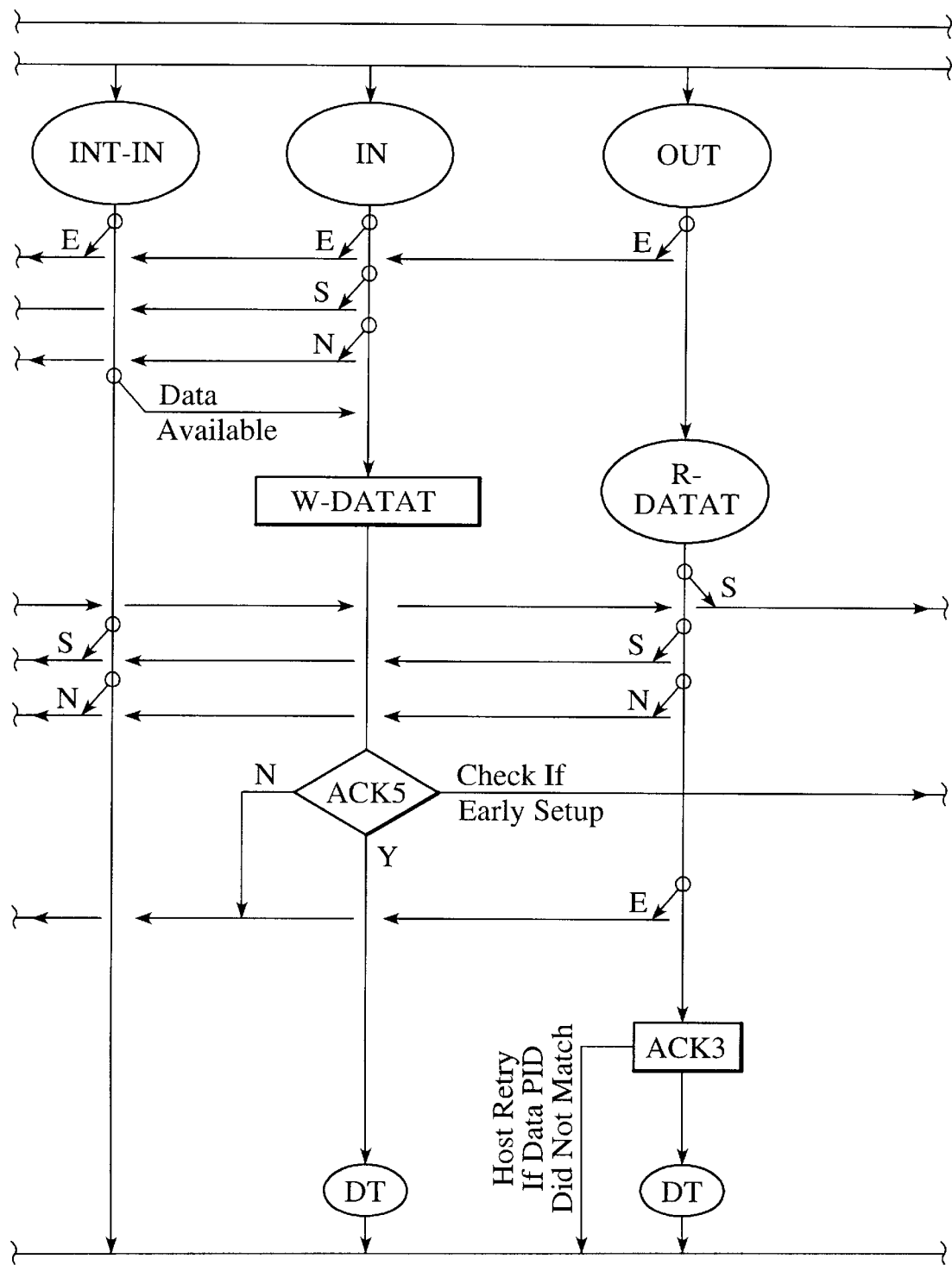
Figure 5D:
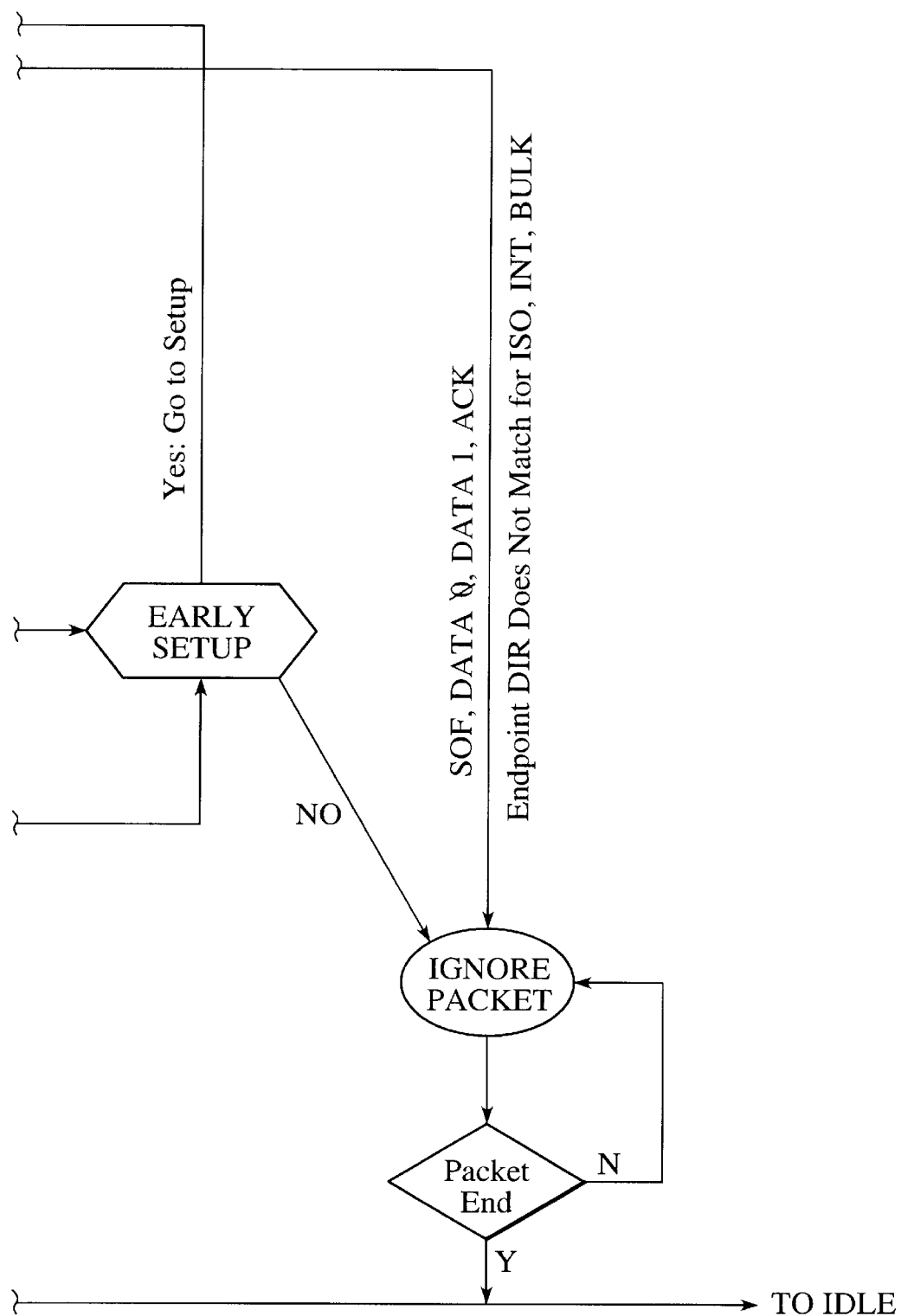

SIE 140 causes PSM 120 (PacketOK and PacketEnd) to transition from the IDLE state to the ISO-OUT state (FIG. 5B). This is followed by a transition to the R2-DATA0 state, where PSM waits for completion of the downstream transfer. Meanwhile, SIE 140 is receiving data from the host and storing it into FIFO 130. Since an isochronous transfer has no handshake phase, completion of the downloaded data (including the CRC) itself marks the end of the transaction. PSMStep is asserted to cause the PSM to transition to the IDLE state.

Consider next time t2, where the next transaction is an upstream transfer of data from endpoint 2. The host begins by issuing an IN packet, specifying endpoint 2. This causes the selector 20 again to access the corresponding Endpoint Control register. PCS 110 initializes the PSM with the following endpoint-related information: EndPtType=BULK, EndPtDir="0" for upstream transfers, and DataToggle="1". Notice that the data toggle bit is now "1", due to the toggling from the previous endpoint transaction.

The microcontroller is interrupted and determines (via the Packet Control register) that an IN packet for endpoint 2 was received. The microcontroller begins to load the second set of data in to FIFO 130. Meanwhile, PSM 120 begins operating when SIE 140 asserts PacketOK and PacketEnd, resulting in a transition from the IDLE state to the IN state (FIG. 5C). This is followed by a transition to the W-DATAT state. In the W-DATAT state, PSM signals the DOH controller 44 in PCS 110 via PSMState to send data contained in FIFO 130 to the host. More specifically, the PSM looks at DataToggle ("1") and signals the PCS to send DATA1.

SIE 140 provides subsequent clocking (NextData) for outputting each byte to be sent. When the last byte has been written into FIFO 130, the microcontroller informs PCS 110 of the fact by writing a DEND (0x7) internal code into the Packet Response register. When the FIFO is empty, PCS 110 deasserts SendData. DOH 150 asserts LastData, signalling SIE 140 to compute the CRC and send it upstream. DOH 150 then asserts PSMStep, causing PSM 120 to transition from W-DATAT state to the ACK5 state. Next, PSM checks if the host sent an ACK, at which point a transition to DT state occurs. Upon entering DT state, PSM 120 signals PCS to toggle the DATA toggle bit of the Endpoint Control Register corresponding to endpoint 2, and then transitions to the IDLE state.

Two observations are worth noting at this point: First, it can be seen that a data transfer (such as the video data with endpoint 2) which requires multiple data transactions can be interleaved with other transactions (in this case an OUT packet with endpoint 3). Each transaction (IN, OUT, etc.) is atomic in the sense that the transaction must complete before another transaction is processed. In addition, state information related to each endpoint is contained in its own endpoint control register (e.g. the data toggle state of endpoint 2) so that there is no loss of state information when transactions among multiple endpoints are interleaved. The second observation is that a single FIFO is sufficient to provide the data buffering between the host and the endpoints defined in a device. Since each transaction is atomic, the FIFO will never contain partial data from a previous transaction.

The present invention includes certain timing features of the USB controller which maximizes the amount of time a microcontroller has to execute a data transfer. The timing chart in FIG. 8 illustrates the data sequence for both an IN and an OUT transaction. A transaction begins with an eight bit SYNC and ends with a three bit EOP. Upon receiving an IN or an OUT PID, the USB controller generates an interrupt to the microcontroller some time after receiving the four bits comprising the endpoint specifier ENDP, the earliest being immediately after receiving ENDP. At this point, the PCS contains the endpoint address of the incoming transaction. Thus, although the host has not completed the transaction, the microcontroller can obtain the endpoint information for the PCS registers and begin setting up for the subsequent DATA transaction.

In the case of an IN transaction, the microcontroller may begin writing data into the FIFO 130 shortly after receiving the interrupt. As can be seen in FIG. 8, the microcontroller has a head start of twenty-four bit-times (CRC+EOP+SYNC+DATA0/1) plus the bus turnaround time, to be discussed below. By that time, the microcontroller must have written the first byte into the FIFO for upstream transfer. For an OUT transaction, the microcontroller has an additional eight bit-times to set things up to receive data from the host. The additional time comes from the fact that the first byte must be written into the FIFO before the microcontroller can pick it up.

The bus turnaround timing specifies the delay between transactions, as shown in FIG. 8. Its value can differ from endpoint to endpoint, and is specified by the BusTurnaround bits (2 bits) of the Endpoint Control registers. In the preferred embodiment, the DOH 150 provides the delay corresponding to the BusTurnaround bits, three bit-times for "00", seven bit-times for "01", eleven bit-times for "10", and fifteen bit-times for "11". Ideally, the bus turnaround time would be zero to obtain maximum throughput. However, some devices may be slow or the host may require a slower speed. The BusTurnaround bits provide for any needed adjustment.

During a data transfer, the FIFO 130 can be written to at the same time it is being read out. Thus, in the case of an IN transfer, the USB controller can be reading data from the the FIFO to send data upstream to the host while at the same time the microcontroller is writing data into the FIFO. The Byte Count register provides the necessary record-keeping to ensure that the FIFO is not empty when transmitting a byte upstream, and that the FIFO is not full when writing byte into the FIFO. Likewise, in the case of an OUT transfer, the microcontroller can be emptying the FIFO as it is being filled by the host.

Yet another feature of the invention is to have a second FIFO 130', as shown in FIG. 11. In a situation where the microcontroller must support many high speed endpoints, a second FIFO can be used to provide additional buffering capability. Thus, the first FIFO can be associated with a first subset of endpoints and the second FIFO associated with a second set of endpoints. As an example, the first FIFO may be receiving data from the host, while the microcontroller is writing data to the second FIFO for an upstream transfer. As soon as downstream transfer completes, the USB controller is immediately able to begin an upstream transfer of data in the second FIFO, while the microcontroller processes the data received in the first FIFO.

I claim:

1. A controller for operating a peripheral in accordance with the Universal Serial Bus (USB) specification, comprising:

means for receiving data packets;

a FIFO for storing data contained in received data packets, said FIFO being associated with at least two endpoints;

a packet control store for storing, as a current endpoint, an identifier contained in an endpoint field of a received data packet, wherein data stored in said FIFO corresponds to said current endpoint;

a state machine to control sequencing of a transaction based on said current endpoint, said transaction including reception and transmission of a plurality of data packets, said state machine thereby being capable of controlling sequencing of transactions with any endpoint;

a plurality of endpoint control stores; and a selector coupled to said plurality of endpoint control stores for selecting one of said endpoint control stores based on said current endpoint;

said state machine coupled to receive the contents of a selected one of said endpoint control stores.

2. The controller of claim 1 further including means for transmitting data packets, coupled to said FIFO for transmission of data from said device.

3. The controller of claim 2 wherein said endpoint control stores include a bus turnaround delay specifier, said means for transmitting data coupled to receive the bus turnaround delay specifier of said selected endpoint control store.

4. The controller of claim 1 further including a port for attachment to a host; said port including means for simulating the disconnection and connection of a universal serial bus device.

5. The controller of claim 4 wherein said port comprises a D+ signal line and a D− signal line and a pull-up resistor coupled to one of said signal lines, said means for simulating includes a first transistor switch coupled to pull said D+ and D− signal lines to a voltage in the range of 2.0 to 0.8 volts and a second transistor switch coupled to disconnect said pull-up resistor.

6. A controller for transmitting data in accordance with the Universal Serial Bus (USB) specification, comprising:

a microcontroller interface for connection to a microcontroller;

a port for attachment to a USB host;

serial means, coupled to said port, for receiving and transmitting USB packets, including means for extracting an endpoint identifier from a packet of a TOKEN type;

control means for managing the transfer of packets between said USB host and said microcontroller, including first memory means for storing an extracted endpoint identifier, thereby defining an active endpoint;

a FIFO for storing data obtained from a received packet, said FIFO associated with said active endpoint;

state machine means, coupled to said control means, for controlling the sequencing of a transaction with said USB host based on said active endpoint, said transaction comprising plural packets; and a second memory means for storing configuration and state information for each endpoint;

said state machine means coupled to said second memory means to receive configuration and state information corresponding to said active endpoint.

7. The controller of claim 6 wherein said second memory means includes a bus turnaround time specifier for each endpoint, said serial means coupled to receive the bus turnaround time specifier corresponding to said active endpoint.

8. The controller of claim 6 further including means for generating an interrupt during the reception of a packet of a TOKEN type, thereby signaling said microcontroller to prepare for storing data to or reading data from said FIFO.

9. The controller of claim 8 wherein said means for generating an interrupt is characterized by producing an interrupt prior to reception of the EOP delimiter of a TOKEN-type of packet.

10. The controller of claim 8 wherein said means for generating an interrupt is characterized by producing an interrupt during reception of the CRC portion of a TOKEN-type of packet.

11. The controller of claim 6 further including means for simulating a disconnection from a USB host and a subsequent reconnection to said USB host.

12. The controller of claim 11 wherein said port includes a D+ signal line, a D− signal line, and a pull-up resistor coupled to one of said signal lines, and wherein said means for simulating includes a first transistor switch coupled to momentarily pull the potential of said D+ and D− lines in the range of 2.0 to 0.8 volts and a second transistor switch coupled to disconnect said pull-up resistor, thereby creating a single-ended zero (SE0) condition.

13. The controller of claim 6 further including a second FIFO wherein each of said FIFO's is associated with a plurality of endpoints; the controller further including means for storing data into one of said FIFO's depending upon the endpoint identified by said active endpoint.

14. A method of transferring data between a host and a device in accordance with the Universal Serial Bus standard, said method comprising:

receiving a first packet, said first packet containing a first endpoint identifier;

storing said first endpoint identifier thereby defining a current endpoint;

receiving a second packet corresponding to said current endpoint, said second packet containing first data;

storing said first data into a first FIFO;

reading out said first data from said first FIFO;

receiving a third packet, said third packet containing a second endpoint identifier;

storing said second endpoint identifier thereby redefining said current endpoint;

receiving a fourth packet corresponding to said current endpoint, said fourth packet containing second data;

storing said second data into said first FIFO; and reading out said second data from said first FIFO;

whereby said first FIFO serves to store data received for each of said first and second endpoints.

15. The method of claim 14 wherein said step of receiving said second packet includes receiving a SYNC, a packet id, a device address, an endpoint address, a CRC, and an EOP delimiter, and said step of reading out said first data is initiated prior to receiving said EOP delimiter.

16. The method of claim 14 wherein said step of receiving said second packet includes receiving a SYNC, a packet id, a device address, an endpoint address, a CRC, and an EOP delimiter, and said step of reading out said first data is initiated during reception of said CRC.

17. The method of claim 14 further including:

receiving a fifth packet, said fifth packet containing a third endpoint identifier;

storing said third endpoint identifier thereby redefining said current endpoint;

receiving a sixth packet corresponding to said current endpoint, said sixth packet containing third data;

storing said third data into a second FIFO; and reading out said third data from said second FIFO.

18. A method of transferring data between a host and a device in accordance with the Universal Serial Bus standard, said method comprising:

producing first data associated with a first endpoint and second data associated with a second endpoint;

receiving a first packet containing an endpoint identifier;

storing said endpoint identifier into a current endpoint store;

selecting one of said first and second data, by matching the endpoint identified in said current endpoint store with one of said first and second endpoints;

storing a selected one of said first and second data into a first FIFO; and transmitting data stored in said first FIFO to said host.

19. The method of claim 18 wherein said step of receiving said first packet includes receiving a SYNC, a packet id, a device address, an endpoint address, a CRC, and an EOP delimiter, and said step of storing data is initiated prior to receiving said EOP delimiter.

20. The method of claim 18 wherein said step of receiving said first packet includes receiving a SYNC, a packet id, a device address, an endpoint address, a CRC, and an EOP delimiter, and said step of storing data is initiated during reception of said CRC.

21. The method of claim 18 further including:

associating a first plurality of endpoints with said first FIFO;

associating a second plurality of endpoints with a second FIFO; and prior to said step of storing data, determining whether the endpoint of said selected data is associated with said first FIFO and if the endpoint of said selected data is associated with said second FIFO, then storing said selected data into said second FIFO.

22. A method of operating a device in accordance with the Universal Serial Bus standard, said method comprising:

associating a first plurality of endpoints with a first FIFO;

associating a second plurality of endpoints with a second FIFO;

receiving a first packet, said first packet containing an endpoint identifier;

storing said endpoint identifier as a current endpoint;

receiving a second packet;

matching said current endpoint to one of said first and second FIFO's; and storing data contained in said second packet into a matched one of said FIFO's.

23. The method of claim 22 wherein said first packet is an IN-type packet.

24. The method of claim 22 wherein said step of storing data contained in said second packet is initiated during reception of said second packet and prior to receiving an EOP delimiter of said second packet.

25. The method of claim 24 further including:

generating data to be sent to a host;

receiving a third packet, said third packet containing a second endpoint identifier;

storing said second endpoint as said current endpoint;

matching said current endpoint to one of said first and second FIFO's;

storing generated data into a matched one of said FIFO's; and transmitting data from said FIFO to said host.

26. The method of claim 25 wherein said third packet is an OUT-type packet.

27. The method of claim 25 wherein said step of storing generated data is initiated during reception of said third packet and prior to receiving an EOP delimiter of said third packet.

* * * * *